United States Patent [19]

Tsutsui et al.

[11] Patent Number: 5,455,316
[45] Date of Patent: Oct. 3, 1995

[54] OLEFIN POLYMERIZATION SOLID CATALYST, OLEFIN POLYMERIZATION CATALYST AND OLEFIN POLYMERIZATION

[75] Inventors: Toshiyuki Tsutsui; Ken Yoshitsugu; Kunio Yamamoto, all of Waki, Japan

[73] Assignee: Mitsui Petrochemical Industries, Ltd., Tokyo, Japan

[21] Appl. No.: 197,975

[22] Filed: Feb. 17, 1994

Related U.S. Application Data

[62] Division of Ser. No. 890,271, May 29, 1992, Pat. No. 5,308,816.

[30] Foreign Application Priority Data

| | | | |
|---|---|---|---|
| May 31, 1991 | [JP] | Japan | 3-129247 |
| May 31, 1991 | [JP] | Japan | 3-129248 |
| Jul. 26, 1991 | [JP] | Japan | 3-187397 |
| Jul. 26, 1991 | [JP] | Japan | 3-187398 |
| Sep. 17, 1991 | [JP] | Japan | 3-236601 |
| Sep. 17, 1991 | [JP] | Japan | 3-236602 |

[51] Int. Cl.$^6$ ............................................. C08F 4/64
[52] U.S. Cl. .................... 526/114; 526/119; 526/129; 526/153; 526/160; 526/904; 526/348.6; 526/348.4; 502/113; 502/120; 502/152
[58] Field of Search ........................ 526/114, 119, 526/129, 153, 160, 904, 348.6

[56] References Cited

U.S. PATENT DOCUMENTS

| | | | |
|---|---|---|---|
| 4,921,825 | 5/1990 | Kioka et al. | 502/104 |
| 5,021,382 | 6/1991 | Malpass, Jr. | 502/117 |
| 5,064,802 | 11/1991 | Stevens et al. | 502/155 |
| 5,252,529 | 10/1993 | Ueda et al. | 502/113 |

FOREIGN PATENT DOCUMENTS

| | | |
|---|---|---|
| 0260130 | 3/1988 | European Pat. Off. . |
| 0406912 | 1/1991 | European Pat. Off. . |
| 0439964 | 8/1991 | European Pat. Off. . |

OTHER PUBLICATIONS

Database WPIL Section Ch, Week 8703, 6 Dec. 1986 Derwent Publications Ltd., London, GB; Class A17, AN 87–018462 & JP–A–61 276 805 (Asahi Chemical Ind KK).

*Primary Examiner*—David W. Wu
*Attorney, Agent, or Firm*—Sherman and Shalloway

[57] ABSTRACT

The present invention relates to a solid catalyst composed of a specific solid catalyst component [A-1], the catalyst containing the solid catalyst and the olefin polymerization process using the solid catalyst, in which the solid catalyst component [A-1] comprises; (a-1) a particulate carrier composed of a specific oxide of a metal; (a-2) an organoaluminum oxy compound; and (a-3) a specific transition metal compound containing a specific ligand, wherein the organoaluminum oxy compound (a-2) and the transition metal compound (a-3) are supported on the particulate carrier (a-1).

The catalysts are applicable to a suspension polymerization and a vapor phase polymerization, and capable of preparing spherical olefin polymers excellent in particle characteristics at high polymerization activity.

18 Claims, 4 Drawing Sheets

OLEFIN POLYMERIZATION SOLID CATALYST, OLEFIN POLYMERIZATION CATALYST AND OLEFIN POLYMERIZATION

This is a division of application Ser. No. 07/890,271 filed May 29, 1992, now U.S. Pat. No. 5,308,816.

FIELD OF THE INVENTION

This invention relates to olefin polymerization solid catalysts, olefin polymerization catalysts and olefin polymerization processes using said olefin polymerization catalysts. More particularly, the present invention relates to olefin polymerization solid catalysts and olefin polymerization catalysts applicable to a suspension polymerization and a vapor phase polymerization and capable of preparing spherical olefin polymers excellent in particle characteristics at high polymerization activity, and to olefin polymerization processes using said catalysts.

BACKGROUND OF THE INVENTION

Known hitherto as catalysts for the preparation of α-olefin polymers, e.g. ethylene polymer or ethylene/α-olefin copolymers, are titanium based catalysts composed of titanium compound and organoaluminum compounds, or vanadium based catalysts composed of vanadium compounds and organoaluminum compounds.

Recently, novel Ziegler type catalysts composed of zirconium compounds and organoaluminum oxy compounds have been developed as catalysts for the preparation of ethylene/α-olefin copolymers in high polymerization activity, and processes for the preparation of ethylene/α-olefin copolymers using these novel catalysts have been proposed, for example, in Japanese Patent L-O-P Publns. Nos. 19309/1983, 35005/1985, 35006/1985, 35007/1985, 35008/1985, etc.

These novel catalysts formed from the transition metal compounds and organoaluminum oxy compounds as proposed in the prior art are excellent in polymerization activity especially ethylene polymerization activity in comparison with the catalysts formed from transition metal compounds and organoaluminum compounds which have been known prior to the advent of the above-mentioned novel catalysts. Nevertheless, the majority of these novel catalysts are soluble in the reaction system and, in most cases, processes for the preparation of ethylene/α-olefin copolymers using these novel catalysts are applicable only to the solution polymerization system. When it is intended to prepare polymers high in molecular weight by using these catalysts, there is brought about such inconvenience that a markedly increased viscosity of the solution containing the resulting polymer will reduce productivity of the process, or there is involved such a problem that the resulting polymers obtained by after-treatment have low balk density and it becomes difficult to obtain spherical olefin polymers excellent in particle characteristics.

In the meantime, attempts have been made to polymerize olefins in the suspension or vapor phase polymerization system by using a catalyst composed of a transition metal compound and an organoaluminum oxy compound, at least one of the compounds has been supported on a porous inorganic oxide carrier such as silica, alumina and silica alumina.

For example, the above-mentioned Japanese Patent L-O-P Publns. Nos. 35006/1985, 35007/1985 and 35008/1985 describe to the effect that catalysts prepared by supporting transition metal compounds and organoaluminum oxy compounds on silica, alumina or silica alumina are useful in the preparation of ethylene/α-olefin copolymers.

Japanese Patent L-O-P Publications Nos. 106808/1985 and 106809/1985 disclose processes for the preparation of compositions containing polyethylene polymers and fillers, wherein ethylene is polymerized or ethylene and other α-olefin are copolymerized in the presence of a product obtained previously by contacting a highly active catalyst component containing a hydrocarbon-soluble titanium compound and/or zirconium compound with a filler, an organoaluminum compound and a filler which has affinity with polyolefins.

Japanese Patent L-O-P Publn. No. 31404/1986 discloses a process for the polymerization of ethylene or copolymerization of ethylene and other α-olefin in the presence of a mixed catalyst comprising a product obtained by reaction of trialkylaluminum with water in the presence of silicon dioxide or aluminum oxide, and a transition metal compound.

Japanese Patent L-O-P Publn. No. 276805/1986 discloses polymerization of olefin in the presence of a catalyst comprising a zirconium compound and a reaction mixture obtained by reacting a reaction mixture resulting from aluminoxane and trialkylaluminum with an inorganic oxide having a surface hydroxyl group such as silica.

Japanese Patent L-O-P Publns. Nos. 108610/1986 and 296008/1986 disclose processes for the polymerization of olefin in the presence of a catalyst having supported a transition metal compound such as metallocene and aluminoxane on a carrier such as inorganic oxide.

However, when olefins were polymerized or copolymerized in the suspension or vapor phase polymerization system in the presence of such solid catalyst components supported by carriers as mentioned above, the polymerization activity attained in these system was very low in comparison with the case of the above-mentioned solution polymerization system, and a bulk density of the polymer thereby formed was not sufficiently satisfactory.

Japanese Patent L-O-P Publin. No. 280703/1988 discloses prepolymerization of olefin in the presence of a zirconosene compound, aluminoxane, an organoaluminum compound and a carrier such as silica. In this process, though the polymerization activity is high and the particle characteristics of the polymer thereby formed are good, there is brought about such inconvenience that the prepolymerization catalysts adhere to a wall of a reactor when the prepolymerization is carried out.

Further, olefin polymers prepared by using the catalysts in prior art usually have narrow molecular weight distribution and the catalysts have been used for obtaining such the polymers as having narrow molecular weight distribution. However, the olefin polymers are sometimes limited in the molding conditions when they have narrow molecular weight distribution and, therefor, the polymers are required to have broad molecular weight distribution according to the process by which they are molded or to the purpose for which they are used.

Moreover, when an inflation film is molded at a high speed from the polymer as formed, the polymer used for must be selected from among those having a large melt tension considering their molecular weight in order to carry out a stable molding operation at a high speed without flickering or tearing the bubble. Similar characteristics are necessary for the polymer at the time of blow molding thereof in order to prevent the sagging or tearing-off of the polymer or at the time of T-die extrusion thereof in order to keep the shortage in breadth of film to a minimum.

OBJECT OF THE INVENTION

The present invention has been made in view of the prior art as mentioned above, and an object of the invention is to provide olefin polymerization solid catalysts and olefin polymerization catalysts applicable to a suspension polymerization and a vapor phase polymerization, and capable of preparing spherical olefin polymers excellent in particle characteristics at high polymerization activity and, moreover, of giving olefin polymers a narrow molecular weight distribution when two or more monomers are polymerized, and polymerization processes of olefins using such olefin polymerization catalysts as mentioned above.

Another object of the invention is to provide olefin polymerization solid catalysts and olefin polymerization catalysts applicable to a suspension polymerization and a vapor phase polymerization, and capable of preparing spherical olefin polymers excellent in particle characteristics at high polymerization activity and, moreover, of giving olefin polymers having excellent melt tension, a broad molecular weight distribution and excellent moldability, and polymerization processes of olefins using such olefin polymerization catalysts as mentioned above.

SUMMARY OF THE INVENTION

Figure 1:
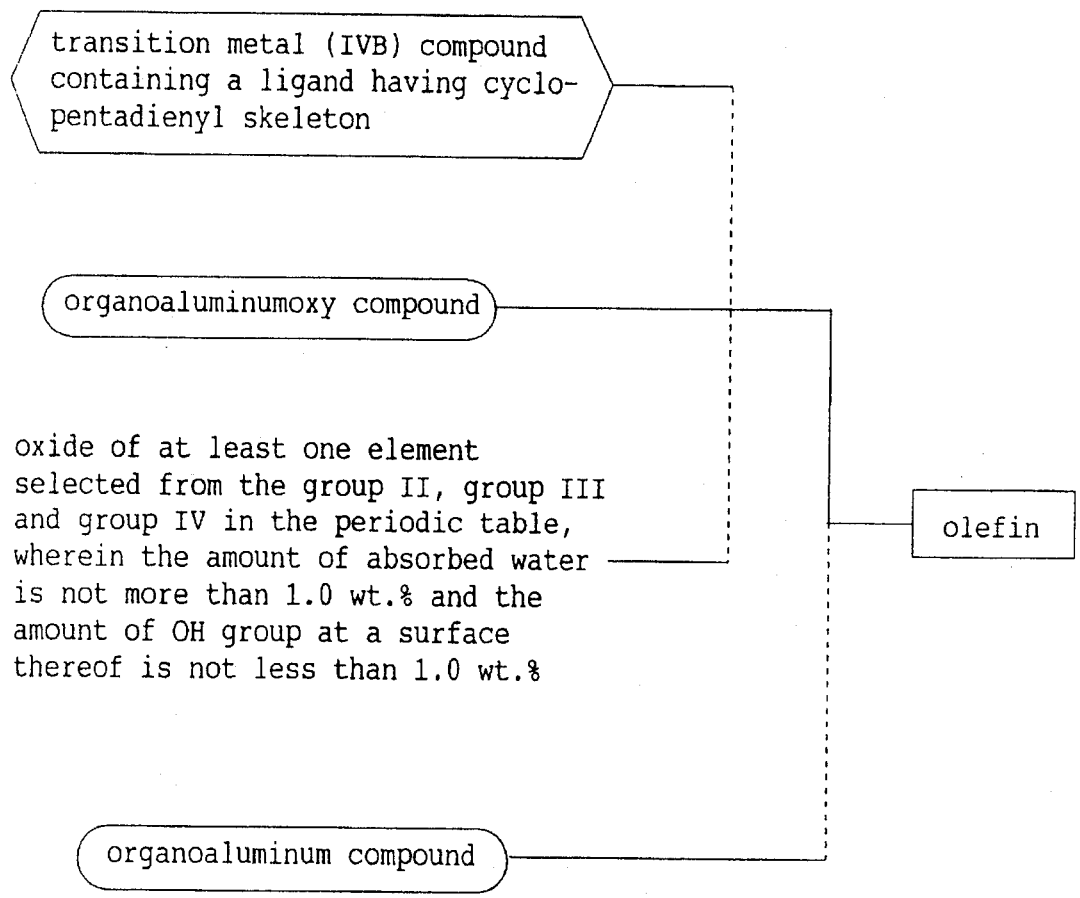
FIG. 1 is a diagram for a preparation of the first olefin polymerization catalyst according to the present invention.

The first olefin polymerization solid catalyst according to the present invention is characterized in that said catalyst is a solid catalyst component [A-1] comprising; (a-1) a particulate carrier composed of (i) an oxide of at least one element selected from among those belonging to the groups of II, III and IV of the periodic table, and containing (ii) less than 1.0% by weight of water and (iii) at least 1.0% by weight of surface hydroxyl groups, (a-2) an organoaluminum oxy compound, and (a-3) a transition metal compound of a metal belonging to the group IVB of the periodic table containing a ligand having a cyclopentadienyl skeleton, wherein the organoaluminum oxy compound (a-2) and the transition metal compound (a-3) are supported on the particulate carrier (a-1).

The first olefin polymerization solid catalyst according to the present invention may compose an olefin polymerization catalyst as a solid catalyst component [A-1] with a catalyst component [C-2] being an organoaluminum compound.

the first olefin polymerization solid catalyst according to the present invention may contain polyolefin prepolymerized in a suspension or in a vapor phase.

The first olefin polymerization solid catalyst according to the present invention is applicable to a suspension polymerization and a vapor phase polymerization, and capable of preparing spherical olefin polymers excellent in particle characteristics at high polymerization activity and, moreover, of giving olefin polymers a narrow molecular weight distribution when two or more monomers are polymerized.

Furthermore, according to the first olefin polymerization solid catalyst of the present invention, when said transition metal compound (a-3) includes at least two kinds of transition metal compounds, the solid catalyst is applicable to a suspension polymerization and a vapor phase polymerization, and capable of preparing spherical olefin polymers excellent in particle characteristics at high polymerization activity and, moreover, of giving olefin polymers excellent melt tension, a broad molecular weight distribution and excellent moldability.

The second olefin polymerization solid catalyst according to the present invention is characterized in that said catalyst formed by prepolymerization of olefin in the presence of;

[A-2]a solid catalyst component comprising (a-1) a particulate carrier composed of (i) an oxide of at least one element selected from among those belonging to the groups of II, III and IV of the periodic table, and containing (ii) less than 1.0% by weight of water and (iii) at least 1.0% by weight of surface hydroxyl groups, and (a-2) an organoaluminum oxy compound, wherein the organoaluminum oxy compound (a-2) is supported on the particulate carrier (a-1); and [B] a catalyst component being a transition metal compound of a metal belonging to the group IVB of the periodic table containing a ligand having a cyclopentadienyl skeleton.

The second olefin polymerization solid catalyst according to the present invention may be formed by prepolymerizing olefin in the presence a solid catalyst component [C-1] being an organoaluminum compound with the solid catalyst component [A-2] and the catalyst component [B].

The second olefin polymerization solid catalyst according to the present invention may compose an olefin polymerization catalyst with a catalyst component [C-2] being an organoaluminum compound.

The second olefin polymerization solid catalyst according to the present invention is applicable to a suspension polymerization and a vapor phase polymerization, and capable of preparing spherical olefin polymers excellent in particle characteristics at high polymerization activity and, moreover, of giving olefin polymers a narrow molecular weight distribution when two or more monomers are polymerized.

Furthermore, according to the second olefin polymerization solid catalyst of the present invention, when said catalyst component [B] includes at least two kinds of transition metal compounds, the solid catalyst is applicable to a suspension polymerization and a vapor phase polymerization, and capable of preparing spherical olefin polymers excellent in particle characteristics at high polymerization activity and, moreover, of giving olefin polymers excellent melt tension, a broad molecular weight distribution and excellent moldability.

DETAILED DESCRIPTION OF THE INVENTION

The olefin polymerization solid catalysts, the olefin polymerization catalyst and the polymerization process using said catalysts according to the present invention are illustrated below in detail.

In the present invention, the term "polymerization" used is intended sometimes to include not only homopolymerization but also copolymerization, and the term "polymer" used herein is intended sometimes to include not only homopolymer but also copolymer.

In the present invention, there are used a solid catalyst component [A-1] in which an organoaluminum oxy compound (a-2), and a transition metal compound (a-3) of a metal belonging to the group IVB of the periodic table and having a specific ligand are supported on a particulate carrier (a-1) composed of an oxide of at least one element selected from among those belonging to the groups II, III and IV of the periodic table, and containing a specific amounts of water and a specific amount of a surface hydroxyl group; and a solid catalyst component [A-2] in which an organoaluminum oxy compound (a-2) is supported on a particulate carrier (a-1) composed of an oxide of at least one element selected from among those belonging to the groups II, III and IV of the periodic table, and containing a specific amount of water and a specific amounts of a surface hydroxyl group.

The particulate carrier (a-1) used for the solid catalyst components [A-1] and [A-2] in the invention includes particulate inorganic compounds comprising an oxide of at least one element selected from among those belonging to the groups II, III and IV of the periodic table.

The particulate inorganic compounds mentioned above are preferably porous oxides including concretely $SiO_2$, $Al_2O_3$, MgO, $ZrO_2$, $TiO_2$, $BO_3$, CaO, ZnO, BaO, $ThO_2$, etc., or mixtures of porous oxides, for example, $SiO_2$-MgO, $SiO_2$-$Al_2O_3$, $SiO_2$-$TiO_2$, $SiO_2$-$V_2O_5$, $SiO_2$-$Cr_2O_3$ and $SiO_2$-$TiO_2$-MgO. Of these particulate inorganic compounds, preferred are those consisting essentially of at least one component selected from the group consisting of $SiO_2$, $Al_2O_3$ and MgO, as a major component.

The particulate carrier (a-1) desirably has an average particle diameter of usually 1–300 μm, preferably 10–200 μm, a specific surface area of 50–1000 $m^2/g$, preferably 100–700 $m^2/g$, and a pore volume of 0.3–2.5 $m^3/g$.

The particulate carrier (a-1) used in the present invention contains less than 1.0% by weight, preferably less than 0.5% by weight of water, and at least 1.0% by weight, preferably 1.0–4.0% by weight and especially 2.0–3.5% by weight of surface hydroxyl group.

The determinations of the water content and surface hydroxyl group content of the particulate carrier may be carried out by the following methods. [adsorbed water content of the carrier]

In the invention, a loss in weight of the particulate carrier obtained by drying the carrier under circulation of nitrogen at 200° C. for 4 hours is taken as the adsorbed water content of said carrier. [surface hydroxyl group content of the carrier]

When a weight of the particulate carrier obtained by drying the carrier under circulation of nitrogen at 200° C. for hours is taken as X (g), and a weight of the particulate carrier obtained by, further, sintering the dryed carrier at 1000° C. for 20 hours to remove the surface hydroxyl group is taken as Y (g), the surface hydroxyl group content of the carrier is calculated by the following formula.

$$\text{surface hydroxyl group (\% by weight)} = \frac{X - Y}{X} \times 100$$

By virtue of the use of such particulate carrier containing specific amount of the adsorbed water and the surface hydroxyl group as mentioned above, it is possible to obtain olefin polymerization catalyst components capable of preparing olefin polymers excellent in the particulate characteristics at high polymerization activity.

The organoaluminum oxy compound (a-2) used in the invention may be aluminoxane hitherto known or such benzene-insoluble organoaluminum oxy compounds.

The known aluminoxane may be prepared, for example, by the following methods.

(1) A method wherein suspensions of compounds containing adsorbed water or salts containing water of crystallization, for example, magnesiumchloride hydrate, copper sulfate hydrate, aluminum sulfate hydrate, nickel sulfate hydrate and cerium (I) chloride hydrate, in hydrocarbon solvents are allowed to react with an organoaluminum compound such as trialkylaluminum, and the desired aluminoxane is recovered as a hydrocarbon solution containing the same.

(2) A method wherein an organoaluminum compound such as trialkylaluminum is treated directly with water, ice or water vapor in such solvent as benzene, toluene, ethyl ether or tetrahydrofuran, and the desired aluminoxane is recovered as a hydrocarbon solution containing the same.

(3) A method wherein an organoaluminum compound such as trialkylaluminum is allowed to react with an organotin oxide in a solvent such as decane, benzene or toluene.

The aluminoxane as illustrated above may contain small amounts of organometallic components. From the above-mentioned solution containing aluminoxane as recovered, the solvent or unaltered organoaluminum compound is removed by distillation, and the remaining aluminoxane may dissolved again in a solvent.

The organoaluminum compound used in preparing the above-mentioned solution of aluminoxane includes concretely trialkylaluminum such as trimethylaluminum, triethylaluminum, tripropylalminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum alkoxide such as dimethylaluminum methoxide or diethylaluminum ethoxide; and dialkylaluminum aryloxide such as diethylaluminum phenoxide.

Of these solvents as exemplified above, particularly preferred are trialkylaluminum.

Furthermore, there may also be used as the organoaluminum compound isoprenylaluminum represented by the general formula $$(i\text{-}C_4H_9)_xAl_y(C_5H_{10})_z \qquad [I]$$

wherein x, y and z are each a positive number, and $z \geq 2x$.

The organoaluminum compounds mentioned above may be used either singly or in combination.

Solvents used in the solutions of aluminoxane include aromatic hydrocarbons such as benzene, toluene, xylene, cumene and cymene; aliphatic hydrocarbons such as pentane, hexane, heptane, octane, decane, dodecane, hexadecane and octadecane; allcyclic hydrocarbons such as cyclopentane, cyclohexane, cyclooctane and methylcyclopentane; petroleum fractions such as gasoline, kerosene and gas oil; or haloganated hydrocarbons such as halides, particularly chloride and bromides, of the above-mentioned aromatic, aliphatic and alicyclic hydrocarbons. In addition thereto, there may also be used ethers other than ethyl ether and tetrahydrofuran. Of these solvents as exemplified above, particularly preferred are aromatic hydrocarbons.

The benzene-insoluble organoaluminum oxy compound may be obtained by 1) a process comprising bringing a solution of an aluminoxane into contact with water or an active hydrogen containing-compound or 2) a process comprising bringing such an organoaluminum as described above into contact with water, directly.

In the first process for obtaining the benzene-insoluble organoaluminum oxy compound, the solution of the aluminoxane is brought into contact with water or the active hydrogen containing-compound.

Examples of the active hydrogen-containing compound include
  alcohols such as methanol, ethanol, n-propanol and isopropanol;
  diols such as ethylene glycol and hydroquinone; and
  organic acids such as acetic acid and propionic acid.

Of these compounds, preferred are alcohols and diols, and particulaly preferred are alcohols.

Water or the active hydrogen containing compound with which the solution of an aluminoxane is brought into contact may be used as a solution or a dispersions in a hydrocarbon solvent such as benzene, toluene and hexane, in an ether solvent such as tetrahydrofuran or in an amine solvent such as triethylamine, or may be used in the form of vapor or solid. The water with which the solution of an aluminoxane is brought into contact may be water of crystallization of a salt such as magnesium chloride, magnesium sulfate, aluminum sulfate, copper sulfate, nickel sulfate, iron sulfate and cerous chloride, or adsorbed water adsorbed to an inorganic compound such as silica, alumina and aluminum hydroxide or a polymer.

Reaction of an aluminoxane in a solution with water or an active hydrogen-containing compound is carried out usually in a solvent.

The solvent includes the solvents described above as the inert solvent, for example, the hydrocarbon solvents such as aromatic hydrocarbons; aliphatic hydrocarbons and alicyclic hydrocarbons, petroleum fractions, halogenated hydrocarbons and ethers. Of these solvents as exemplified above, particularly preferred are aromatic hydrocarbons.

In the reaction as mentioned above, water or the active hydrogen-containing compound is used in an amount of 0.1–5 moles, preferably 0.2–3 moles based on 1 g atom of Al present in the solution of an aluminoxane. The concentration in terms of aluminum atom in the reaction system is desirably $1\times10^{-3}$–5 gram atom/l, preferably $1\times10^{-2}$–3 gram atom/l, and the concentration of water in the reaction system is desirably $2\times10^{-4}$–5 mol/l, preferably $2\times10^{-3}$–3 mol/l.

The solution of an aluminoxane may be brought into contact with water or the active hydrogen-containing compound, for example, by the following procedures.

(1) A procedure which comprises bringing the solution of an aluminoxane into contact with a hydrocarbon solvent containing water or the active hydrogen-containing compound.

(2) A procedure which comprises blowing steam or the vapor of the active hydrogen-containing compound into the solution of an aluminoxane, thereby bringing the aluminoxane into contact with the steam or vapor.

(3) A procedure which comprises bringing the solution of an aluminoxane into contact directly with water, ice or the active hydrogen-containing compound.

(4) A procedure which comprises mixing the solution of an aluminoxane with a suspension of an adsorbed water-containing compound or a water of crystallization-containing compound in hydrocarbon, or with a suspension of a compound, to which the active hydrogen-containing compound is adsorbed, in hydrocarbon, thereby bringing the aluminoxane into contact with the adsorbed water or water of crystallization.

The solution of an aluminoxane may contain other components so long as they do not exert adverse effects on the reaction of the aluminoxane with water or the active hydrogen-containing compound.

The above-mentioned reaction of an aluminoxane in a solution with water or the active hydrogen-containing compound is carried out at a temperature of usually –50° to 150° C., preferably 0° to 120° C., more preferably 20° to 100° C. The reaction time employed is usually 0.5 to 300 hours, preferably about 1 to 150 hours, though said reaction time varies largely depending upon the reaction temperature used.

In the second process for obtaining the benzene insoluble organoaluminum oxy-compound, such an organoaluminum as described above is brought into contact with water directly.

In this case, water is used in such an amount that the organoaluminum atoms dissolved in the reaction system are not greater than 20%, based on the total organoaluminum atoms.

Water with which the organoaluminum compound is brought into contact may be used as a solution or dispersion in a hydrocarbon solvent such as benzene, toluene and hexane, an ether solvent such as tetrahydrofuran or an amine solvent such as triethylamine, or may be used in the form of steam or ice. The water with which the organoaluminum compound is brought into contact may be water of crystallization of a salt such as magnesium chloride, magnesium sulfate, aluminum sulfate, copper sulfate, nickel sulfate, iron sulfate and cerous chloride, or adsorbed water adsorbed to an inorganic compound such as silica, alumina and aluminum hydroxide or a polymer.

Reaction of the organoaluminum compound with water is carried out usually in a solvent, for example, the compounds described above as the inert solvent. Of these solvents as exemplified above, particularly preferred are aromatic hydrocarbons.

The concentration of the organoaluminum compound in the reaction system in terms of aluminum atom is desirably $1\times10^{-3}$–5 gram atom/l, preferably $1\times10^{-2}$–3 gram atom/l, and the concentration of water in the reaction system is desirably $1\times10^{-3}$–5 mol/l, preferably $1\times10^{-2}$–3 mol/l. In the reaction mentioned above, the organoaluminum atoms dissolved in the reaction system are not greater than 20%, preferably not greater than 10%, more preferably 0 to 5% based on the total organoaluminum atoms.

The organoaluminum compound may be brought into contact with water, for example, by the following procedures.

(1) A procedure which comprises bringing the hydrocarbon solution of the organoaluminum into contact with a hydrocarbon solvent containing water.

(2) A procedure which comprises blowing steam into the hydrocarbon solution of the organoaluminum, etc., thereby bringing the organoaluminum into contact with the steam.

(3) A procedure which comprises mixing the hydrocarbon solution of the organoaluminum with a suspension of an adsorbed water-containing compound or a water of crystallization-containing compound in hydrocarbon, thereby bringing the organoaluminum into contact with the adsorbed water or water of crystallization.

(4) A procedure which comprises bringing the hydrocarbon solution of the organoaluminum into contact directly with ice.

The hydrocarbon solution of the organoaluminum as described above may contain other components so long as they do not exert adverse effects on the reaction of the organoaluminum with water.

The above-mentioned reaction of the organoaluminum with water is carried out at a temperature of usually −100° to 150° C., preferably −70° to 100° C., more preferably at −50° to 80° C. The reaction time employed is usually 1 to 200 hours, preferably 2 to 100 hours, though the reaction time varies largely depending upon the reaction temperature.

The benzene-insoluble organoaluminum oxy compounds used in the invention contain an Al component soluble in benzene at 60° C. in an amount of not greater than 10%, preferably not greater than 5%, particularly preferably not greater than 2% in terms of Al atom, and they are insoluble or sparingly soluble in benzene. Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing 4 times the solid portion separated on the filter with 50 ml of benzene at 60° C., and measuring the amount (xmmole) of Al atoms present in the whole filtrate.

When the benzene-insoluble organoaluminum oxy-compounds as described above of the present invention are analyzed by infrared spectrophotometry (IR), a ratio ($D_{1260}/D_{1220}$) of an absorbance ($D_{1260}$) at about 1260 cm$^{-1}$ to an absorbance ($D_{1220}$) at about 1220 cm$^{-1}$ is preferably not greater than 0.09, more preferably not greater than 0.08, particularly preferably in the range of 0.04 to 0.07.

Infrared spectrophotometric analysis of the organoaluminum oxy-compounds is carried out in the following manner.

First, the organoaluminum oxy-compound is ground, together with nujol, in an agate mortar in a nitrogen box to form paste. Next, the paste-like sample thus obtained is held between KBr plates, and IR spectrum is measured in a nitrogen atmosphere by means of IR-810 manufactured by Nippon Bunko K.K. From the thus obtained IR spectrum, a $D_{1260}/D_{1220}$ ratio is sought, and a value of said ratio is obtained in the following manner.

(a) A line connecting a maximum point at about 1280 cm$^{-1}$ and a maximum point at about 1240 cm$^{-1}$ is taken as a base line $L_1$.

(b) A transmittance (T %) of an absorption minimum point at about 1260 cm$^{-1}$ and a transmittance ($T_0$%) of a point of intersection formed by a vertical line from said absorption minimum point to a wave number axis (abscissa) and said base line $L_1$ are read, and an absorbance ($D_{1260}$=log $T_0/T$) is calculated.

(c) Similarly, a line connecting maximum points at about 1280 cm$^{-1}$ and at about 1180 cm$^{-1}$ is taken as a base line $L_2$.

(d) A transmittance (T' %) of an absorption minimum point at about 1220 cm$^{-1}$ and a transmittance ($T'_0$ %) of a point of intersection formed by a vertical line from said absorption minimum point to a wave number axis (abscissa) and said base line $L_2$ are read, and an absorbance ($D_{1220}$=log $T'_0/T'$) is calculated.

(e) From these values as obtained above, a $D_{1260}/D_{1220}$ ratio is calculated.

The benzene-soluble organoaluminum oxy compound has a $D_{1260}/D_{1220}$ value of about 0.10 to 0.13, and thus the benzene-insoluble organoaluminum oxy compound of the present invention obviously differ from the known benzene-soluble organoaluminum oxy compound on the value of $D_{1260}/D_{1220}$.

The organoaluminum oxy compounds as described above are estimated to have an alkyloxyaluminum unit represented by the formula [II]

[II]

In the above-mentioned alkyloxyaluminum unit of the benzene-insoluble organoaluminum oxy-compounds used in the invention, $R^1$ includes hydorocarbon groups having 1–9 carbon atoms, for example, methyl, ethyl, n-propyl, isopropyl, nbutyl, isobutyl, pentyl, hexyl, octyl, decyl, cyclohexyl and cyclooctyl. Of these hydrocarbon groups exemplified above, preferred are methyl and ethyl, and particularly preferred is methyl. In the benzene-insoluble organoaluminum oxy compounds, one or more kinds of the above-mentioned alkyloxyaluminum units (i) may be contained.

In addition to the alkyloxyaluminum unit (i) of the formula [II], one or more kinds of an alkyloxyaluminum unit (ii) represented by the following formula [III] may be contained.

[III]

wherein $R^2$ is a hydrocarbon group of 10 to 12 carbon atoms, a alkoxy group of 1–12 carbon atoms, aryloxy group of 6–20 carbon atoms, hydroxyl group, halogena or hydrogen.

In this case, the organoaluminum oxy compounds desirably contain the alkyloxyaluminum unit (i) and the alkyloxyaluminum unit (ii) so that the alkyloxyaluminum unit (i) is in a proportion of not less than 30 mol % preferably not less than 50 mol % particularly preferably not less than 70 mol %.

The solid catalyst component [A-2] used in the invention is prepared by using the above.components (a-1) and (a-2). The solid catalyst component [A-1] used in the invention is prepared by using the transition metal compound (a-3) of a metal belonging to the group IVB of the periodic table having a cyclopentadienyl skeleton in addition to the components (a-1) and (a-2). The transition metal compound (a-3) of a metal belonging to the group IVB of the periodic table containing a ligand having a cyclopentadienyl skeleton used in the present invention is represented by the formula [IV]

[IV]

wherein M is a transition metal of IVB group, L is a ligand coordinating to the transition metal, at least one of L is a ligand having a cyclopentadienyl skeleton, L other than the ligand having a cyclopentadienyl skeleton is a hydrocarbon group of 1–12 carbon atoms, an alkoxy group, an aryloxy group, halogen, trialkylsilyl group, SO$_3$R (wherein R is a hydrocarbon group of 1 to 8 carbon atoms which may have a substituent such as halogen), or hydrogen, and x is a valence of the transition metal.

The ligands having a cyclopentadienyl skeleton include, for example, cyclopentadienyl, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, and hexylcyclopentadienyl, and an indenyl group, 4, 5, 6, 7-tetrahydroindenyl group and a fluorenyl group. These groups may be substituted by a halogen atom or trialkylsilyl group.

Of these ligands coordinating to the transition metal, the alkyl-substituted cyclopentadienyl groups are most preferred.

When the compound represented by the formula $ML_x$[IV] contains two or more ligands having a cyclopentadienyl skeleton, at least two ligands having a cyclopentadienyl skeleton may be bonded together via an alkylene group such as ethylene and propylene, an isopropylidene group, a substituted alkylene group such as diphenylmethylene, a silylene group or a substituted silylene group such as dimethylsilylene, diphenylsilylene and methylphenylsilylene.

The ligand other than those having a cyclopentadienyl skeleton is a hydrocarbon group of 1–12 carbon atoms, an alkoxy group, an aryloxy group, halogen, trialkylsilyl group, $SO_3R$, or hydrogen.

The hydrocarbon group having 1–12 carbon atoms includes, for example, alkyl, cycloalkyl, aryl and aralkyl; the alkyl group includes methyl, ethyl, propyl, isopropyl, butyl and pentyl; the cycloalkyl group includes, for example, cyclopentyl and cyclohexyl; the aryl group includes, for example, phenyl and tolyl; and the aralkyl group includes, for example, benzyl and neophyl.

The alkoxy group includes, for example, methoxy, ethoxy and butoxy.

The aryloxy group includes, for example, phenoxy.

The halogen includes, for example, fluorine, chlorine, bromine and iodine.

The ligand represented by $SO_3R$ includes, for example, p-toluenesulfonate, methanesulfonate and trifluoromethanesulfonate.

In the present invention, the transition metal compound (a-3) of a metal belonging to the group of IVB containing ligands having a cyclopentadienyl skeleton used for the preparation of the solid catalyst component [A-1] includes the transition metal having, for example, a valence of 4. The transition metal compound (a-3) may be represented more concretely by the formula [IV']

$$R^1_a R^2_b R^3_c R^4_d M \qquad [IV']$$

wherein M is zirconium, titanium, or hafnium, $R^1$ is a group having a cyclopentadienyl skeleton, , $R^2$, $R^3$ and $R^4$ are each a group having a cyclopentadienyl skeleton, an alkyl, cycloalkyl, aryl, aralkyl, alkoxy or aryloxy group, halogen, trialkylsilyl group, $SO_3R$ or hydrogen, a is an integer of at least 1, and a+b+c+d=4.

In the transition metal compounds of the above-mentioned formula [IV'], at least one of $R^2$, $R^3$ and $R^4$ having a cyclopentadienyl skeleton is preferred, that is, $R^1$ and $R^2$ are each a group having a cyclopentadienyl skeleton. These groups having a cyclopentadienyl skeleton may be bonded to each other via an alkylene group such as ethylene and propylene, a substituted alkylene group such as diphenylmethylene, an alkylidene group such as isopropylidene, a silylene group or a substituted silylene group such as dimethylsilylene, diphenylsilylene and methylphenylsilylene.

Also, $R^3$ and $R^4$ may be each a group having a cyclopentadienyl skeleton, an alkyl, cycloalkyl, aryl, aralkyl, alkoxy or aryloxy group, halogen, trialkylsilyl group, $SO_3R$ or hydrogen.

Listed below are typical representatives of the transition metal compounds (a-3) having a cyclopentadienyl skeleton, represented by the aforementioned formula $ML_x$ in which M is zirconium.

Bis(indenyl)zirconium dichloride,
Bis (indenyl) zirconium dibromide,
Bis (indenyl) zirconium bis (p-toluenesulfonate),
Bis (4,5, 6, 7-tetrahydroindenyl) zirconium dichloride,
Bis (fluorenyl) zirconium dichloride,
Ethylenebis (indenyl) zirconium dichloride,
Ethylenebis (indenyl) zirconium dibromide,
Ethylenebis (indenyl) dimethyl zirconium,
Ethylenebis (indenyl) diphenyl zirconium,
Ethylenebis (indenyl) methyl zirconium monochloride,
Ethylenebis (indenyl)zirconium bis (mehtanesulfonate),
Ethylenebis (indenyl) zirconium bis (p-toluenesulfonate),
Ethylenebis (indenyl) zirconium bis (trifluoromethanesulfonate),
Ethylenebis (4, 5, 6, 7-tetrahydroindenyl) zirconium dichloride,
Isopropylidene (cyclopentadienyl-fluorenyl) zirconium dichloride,
Isopropylidene (cyclopentadienyl-methylcyclopentadienyl) zirconium dichloride,
Dimethylsilylenebis (cyclopentadienyl) zirconium dichloride,
Dimethylsilylenebis (methylcyclopentadienyl) zirconium dichloride,
Dimethylsilylenebis (dimethylcyclopentadienyl) zirconium dichloride,
Dimethylsilylenebis (trimethylcyclopentadienyl) zirconium dichloride,
Dimethylsilylenebis (indenyl) zirconium dichloride,
Dimethylsilylenebis (indenyl) zirconium bis (trifluoromethanesulfonate),
Dimethylsilylenebis (4, 5, 6, 7-tetrahydroindenyl) zirconium dichloride,
Dimethylsilylene (cyclopentadienyl-fluorenyl) zirconium dichloride,
Diphenylsilylenebis (indenyl) zirconium dichloride,
Methylphenylsilylenebis (indenyl) zirconium dichloride,
Bis (cyclopentadienyl) zirconium dichloride,
Bis (cyclopentadienyl) zirconium dibromide,
Bis (cyclopentadienyl) methyl zirconium monochloride,
Bis (cyclopentadienyl) ethyl zirconium monochloride,
Bis (cyclopentadienyl) cyclohexyl zirconium monochloride,
Bis (cyclopentadienyl) phenyl zirconium monochloride,
Bis (cyclopentadienyl) benzyl zirconium monochloride,
Bis (cyclopentadienyl) zirconium monochloride monohydride,
Bis (cyclopentadienyl) methyl zirconium monohydride,
Bis (cyclopentadienyl) dimethyl zirconium,
Bis (cyclopentadienyl) diphenyl zirconium,
Bis (cyclopentadienyl) dibenzyl zirconium,
Bis (cyclopentadienyl) zirconium methoxy chloride, Bis (cyclopentadienyl) zirconium ethoxy chloride,
Bis (cyclopentadienyl) zirconium bis (mehtanesulfonate),
Bis (cyclopentadienyl) zirconium bis (p-toluenesulfonate),
Bis (cyclopentadienyl) zirconium bis (trifluoromethanesulfonate),
Bis (methylcyclopentadienyl) zirconium dichloride,
Bis (dimethylcyclopentadienyl) zirconium dichloride,
Bis (dimethylcyclopentadienyl) zirconium ethoxy chloride,
Bis (dimethylcyclopentadienyl) zirconium bis (trifluoromethanesulfonate),
Bis (ethylcyclopentadienyl) zirconium dichloride,
Bis (methylethylcyclopentadienyl) zirconium dichloride,
Bis (propylcyclopentadienyl) zirconium dichlOride,
Bis (methylpropylcyclopentadienyl) zirconium dichloride,
Bis (buthylcyclopentadienyl) zirconium dichloride,
Bis (methylbuthylcyclopentadienyl) zirconium dichloride,
Bis (methylbuthylcyclopentadienyl) zirconium bis (mehtanesulfonate),
Bis (trimethylcyclopentadienyl) zirconium dichloride,
Bis (tetramethylcyclopentadienyl) zirconium dichloride,
Bis (pentamethylcyclopentadienyl) zirconium dichloride,
Bis (hexylcyclopentadienyl) zirconium dichloride,
Bis (trimethylsilylcyclopentadienyl) zirconium dichloride In the above-mentioned transition metal compound, the di-substituted cyclopentadienyl groups include 1, 2- and 1,3-substituted groups, and the tri-substituted cyclopentadienyl groups include 1, 2, 3- and 1, 2, 4- substituted groups. Also the alkyl groups such as propyl and butyl include n-, i-, secand tert- isomers.

There may also be used transition metal compounds obtained by replacing the zirconium metal in the above-exemplified zirconium compounds with titanium metal or hafnium metal.

These transition metal compounds (a-3) may be used alone or in combination. When the transition metal compound (a-3) is used in combination, it is preferred that at least one member selected from the group consisting of compounds (i) and (ii) as mentioned below is combined with at least one member selected from the group consisting of compound (iii) and (iv) as mentioned below.

The compounds (i), (ii) (iii) and (iv) are explained below.

(i) Transition metal compound containing two ligands having a cyclopentadienyl skeleton, in which the ligands are bonded together via a substituted or unsubstituted alkylene group, a substituted or unsubstituted silylene group and the like (hereinafter referred to "bridge type transition metal compound").

(ii) Transition metal compound containing two ligands having a cyclopentadienyl skeleton, in which the ligands are not bonded each other (hereinafter referred to "non-bridge type transition metal compound"), and the ligands have 2 to 5 substituents.

(iii) Transition metal compound containing a ligand having a cyclopentadienyl skeleton, which is the non-bridge type transition metal compound, wherein the ligand has no substituent.

(iv) Transition metal compound containing a ligand having a cyclopentadienyl skeleton, which is the non-bridge type transition metal compound, wherein the ligand has one substituent.

In the above combinations, it is most preferred that (ii) non-bridge type transition metal compound containing ligands having a cyclopentadienyl skeleton, wherein the ligands have, particularly, 2 to 3 substituents, is combined with (iv) non-bridge type transition metal compound containing a ligand having a cyclopentadienyl skeleton, wherein the ligand has one substituent.

When two kinds of compounds (a-3) are mixed, one compound is preferably used in an amount of from 5 to 95 mol %, more preferably 10 to 90 mol %, and most preferably 20 to 80 mol %. When three or more kinds of compounds (a-3) are mixed, the mixing ratio is not particularly limited, but one kind of them is used preferably in an amount of not more than 95 mol % and not less than 5 mol %.

The first olefin polymerization solid catalyst is the solid catalyst component [A-1] formed from the components describes above, namely, the particulate carrier (a-1), the organoaluminum oxy compound (a-2) and the transition metal compound (a-3).

When a compound (a-3) is singly used for the preparation of the first olefin polymerization solid catalyst, an olefin polymer having a narrow molecular weight distribution can be obtained. When at least two compounds (a-3) are used for the preparation of the first olefin polymerization solid catalyst, an olefin polymer having a broad molecular weight distribution and an excellent moldability can be obtained.

The first olefin polymerization solid catalyst may be used as it is for olefin polymerization and may be used for the olefin polymerization after the prepolymerization in a suspension or a vapor phase, optionally in the presence of an roganoaluminum compound [C-1].

The first olefin polymerization catalyst of the invention is formed from the first olefin polymerization solid catalyst (solid catalyst component [A-1]) and an organoaluminum compound as a catalyst component [C-2] and used for the olefin polymerization.

The second olefin polymerization solid catalyst is formed by prepolymerizing olefin in a solution or in vapor phase in the presence of the solid catalyst component [A-2] formed from the particulate carrier (a-1) and the organoaluminum oxy compound (a-2), the transition metal compound [B] of a metal belonging to IVB group of the periodic table containing a cycloalkadienyl skeleton as a catalyst component and, optionally, an organoaluminum compound as a catalyst component [C-1].

As the transition metal compounds [B] of a metal belonging to the group IVB of the periodic table containing a cyclopentodienyl skeleton used for the preparation of the second olefin polymerization catalyst, there can be exemplified the transition metal compounds (a-3) used for the preparation of the first olefin polymerization solid catalyst. These transition metal compounds [B] may be used alone or in combination. When a compound [B] is used for the preparation of the second olefin polymerization solid catalyst, an olefin polymer having a narrow molecular weight distribution can be obtained.

In case that at least two kinds of the catalyst components [B] are used, there may be exemplified, as the preferred combinations, those of at least two kind of the transition metal compounds (a-3) used for the first olefin polymerization solid catalyst. The preferred combination ratios of the catalyst components [B] may be the same as those of the transition metal compounds (a-3). When at least two compounds [B] are used for the preparation of the second olefin polymerization solid catalyst, an olefin polymer having a broad molecular weight distribution and an excellent moldability can be obtained.

The organoaluminum compounds [C-1] and [C-2] used for the preparations of the first and second olefin polymerization solid catalyst, and the first olefin polymerization catalyst are represented by the formula:

$$R^5{}_n AlX_{3-n} \quad [III]$$

wherein $R^5$ is hydrocarbon of 1–12 carbon atoms, X is halogen or hydrogen, and n is 1–3.

In the above-mentioned formula, $R^5$ is hydrocarbon of 1–12 carbon atoms, for example, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds of the formula $R^5{}_n AlX_{3-n}$ include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylalulminum sesquichloride, ethylaluminum sesquichloride, isopropylaluminum sesqufchloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds [C-1] and [C-2], there may also be used a compound represented by the following formula:

$$R^5{}_n AlY_{3-n} \quad [IV]$$

wherein $R^5$ is as defined above, Y is $-OR^6$, $-OSiR^7{}_3$, $-OAlR^8{}_2$, $-NR^9{}_2$, $-SiR^{10}{}_3$, or $-N(R^{11})AlR^{12}{}_2$, n is 1–2 and $R^6$, $R^7$, $R^8$ and $R^{12}$ are each methyl, ethyl, isopropyl, isobutyl, cyclohexyl, phenyl, etc; $R^9$ is hydrogen, methyl, ethyl, isopropyl, phenyl, trimethylsilyl, etc; and $R^{10}$ and $R^{11}$ are each methyl, ethyl, etc.

The organoaluminum compounds of the formula $R^5{}_n AlY_{3-n}$ [IV] include, in concrete, such compounds as mentioned below.

(i) Compounds of the formula $R^5{}_n Al(OR^6)_{3-n}$ such as dimethylaluminum methoxide, diethylaluminum ethoxide, diisobutylaluminum methoxide, etc;

(ii) Compounds of the formula $R^5{}_n Al(OSiR^7{}_3)_{3-n}$ such as $(C_2H_5)_2AlOSi$ $(CH_3)_3$, $(iso-C_4H_9)_2AlOSi(CH_3)_3$, $(iso-C_4H_9)_2AlOSi(C_2H_5)_3$, etc;

(iii) Compounds of the formula $R^5{}_n Al(OAlR^8{}_2)_{3-n}$ such as $(C_2H_5)_2AlOAl$ $(C_2H_5)_2$, $(iso-C_4H_9)_2AlOAl$ $(iso-C_4H_9)_2$, etc;

(iv) Compounds of the formula $R^5{}_n Al(NR^9{}_2)_{3-n}$ such as $(CH_3)_2AlN$ $(C_2H_5)_2$, $(C_2H_5)_2AlNHCH_3$, $(CH_3)_2AlNH$ $(C_2H_5)$; $(C_2H_5)_2AlN$ $(Si(CH_3)_3)_2$, $(iso-C_4H_9)_2AlN$ $(Si(CH_3)_3)_2$, etc;

(v) Compounds of the formula $R^5{}_n Al(SiR^{10}{}_3)_{3-n}$ such as $(iso-C_4H_9)_2AlSi$ $(CH_3)_3$, etc; and (vi) Compounds of the formula $R^5{}_n Al$ $(N(R^{11})AlR^{12}{}_2)_{3-n}$ such as $(C_2H_5)_2AlN$ $(CH_3)Al(C_2H_5)_2$, $(iso-C_4H_9)_2AlN$ $(C_2H_5)Al$ $(iso-C_4H_9)_2$, etc.

Of the organoaluminum compounds as exemplified above formulae [III] and [IV], preferred are those of the formula $R^5{}_3Al$, $R^5{}_n Al$ $(OR^6)_{3-n}$ or $R^5{}_n Al$ $(OAlR^8{}_2)_{3-n}$, and particularly preferred is that in which $R^5$ is isoalkyl and n is 2. These organoaluminum compounds may be used alone or in combination.

Processes for preparations of the olefin polymerization solid catalyst and the olefin polymerization catalyst, in which there are used the above components (a-1), (a-2) and (a-3), the above solid catalyst components [A-1] and [A-2], and the catalyst components [B] and [C-1], [C-2], are illustrated below in detail.

The first olefin polymerization solid catalyst can be prepared by making the organoaluminum oxy compound (a-2) and the transition metal compound of the metal belonging to the group IVB of the periodic table containing the ligand having the cyclopentadienyl skeleton (a-3) supported on the above-mentioned particulate carrier (a-1) to prepare the solid catalyst component [A-1] and the contact of each components can be carried out in inert hydrocarbon solvent.

The first olefin polymerization catalyst of the present invention may be prepared by mixing the solid catalyst component [A-1] and the catalyst component [C-2] in the inert hydrocarbon solvent.

As the inert hydrocarbon solvent used in the preparation of the first olefin polymerization solid catalyst and the first olefin polymerization catalyst, there may be mentioned an aliphatic hydrocarbon, such as propane, butane, pentane, hexane, heptane, octane, decane, dodecane and kerosene;

an alicycloic hydrocarbon, such as cyclopentane, cyclohexane and methylcyclohexane;

an aromatic hydrocarbon, such as benzene, toluene and xylene;

a halogenated hydrocarbon, such as ethylene chloride, chlorobenzene and dichloromethane; and a mixture thereof.

The contact of the components (a-1), (a-2) and (a-3), which compose the solid catalyst component [A-1] (the first olefin polymerization solid catalyst), and the catalyst component [C-2] may be conducted in an arbitrarily selected order to prepare the first olefin polymerization catalyst, as far as the solid catalyst component [A-1] is produced as an intermediate product. When at least two kind of the components (a-3) of the solid catalyst component [A-1] are used, it is preferred that the components (a-3) are previously mixed together.

Figure 2:
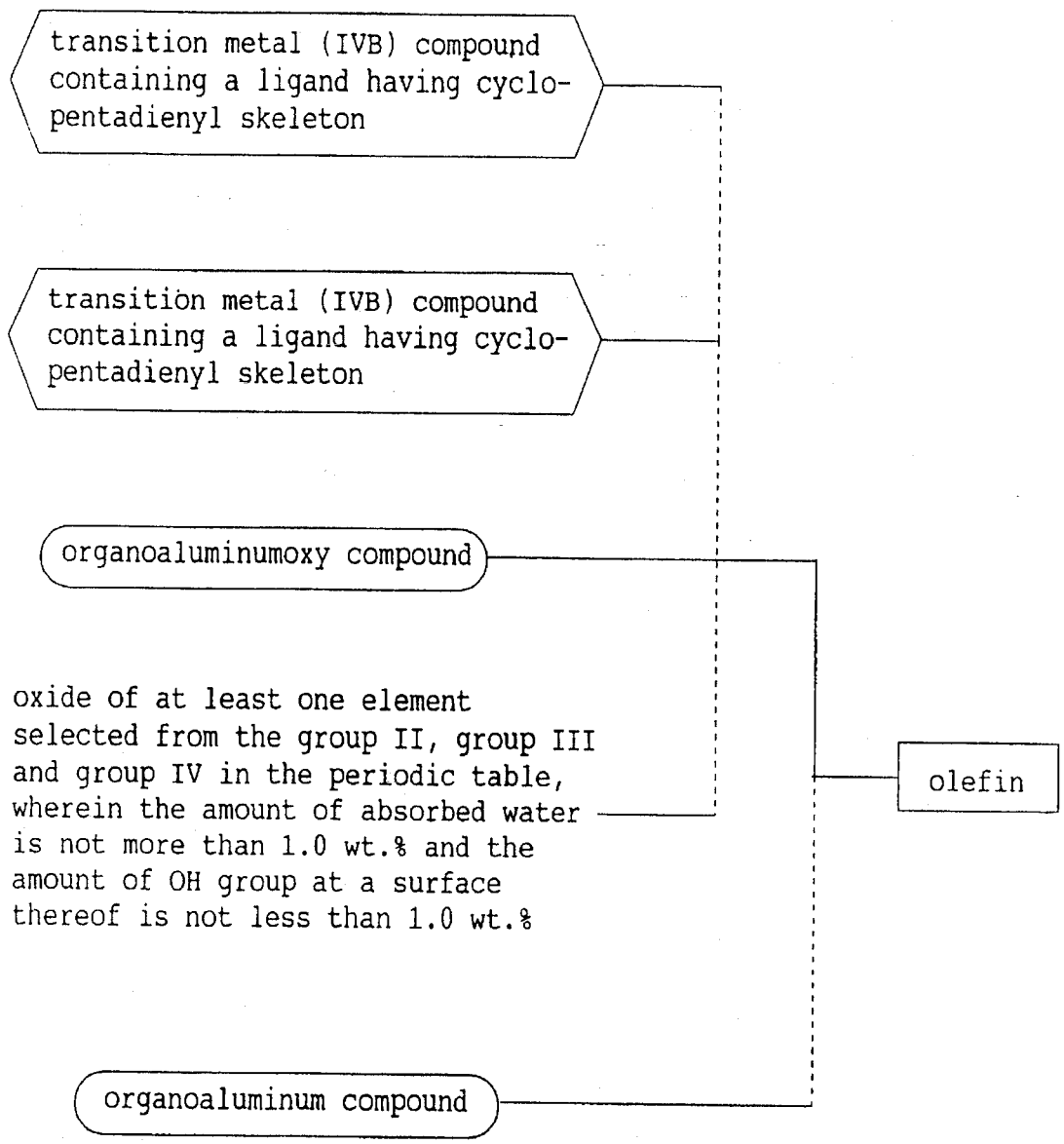
FIG. 2 is the other diagram for a preparation of the first olefin polymerization catalyst according to the present invention.

In each of FIGS. 1 and 2, a diagram for the preparation of the first olefin polymerization catalyst is shown.

The preferred preparations of the first olefin polymerization catalyst are exemplified as follows;

The particulate carrier (a-1) and the organoaluminum oxy compound (a-2) are mixed and contacted, followed by mixing and contacting the transition metal compound (a-3) and, if necessary, the organoaluminum compound [C-2] is mixed thereto;

the particulate carrier (a-1) is mixed and contacted with a mixture of the organoaluminum oxy-compound (a-2) and the transition metal compound (a-3), and, if necessary, the organoaluminum compound [C-2] is mixed thereto.

When the compounds (a-1), (a-2) and (a-3), which compose the solid catalyst component [A-1], are mixed and contacted, and when the compound [C-2] is optionally added to the component (a-1), (a-2) and (a-3), the compound (a-3) is used usually in an amount of $5 \times 10^{-6}$ to $5 \times 10^{-4}$ mol, preferably $10^{-5}$ to $2 \times 10^{-4}$ mol based on 1 g of the compound (a-1), and the concentration thereof is $10^{-4}$ to $2 \times 10^{-2}$ mol/l, preferably $2 \times 10^{-4}$ to $10^{-2}$ mol/l. The atomic ratio $[OH/Al_{a-2}]$ of the surface hydroxyl group of the component (a-1) to the component (a-2) is usually 0.1 to 0.5, preferably 0.15 to 0.4.

The atomic ratio [Al/(transition metal)] of the aluminum in the component (a-2) to the transition metal in the component (a-3) is usually 10 to 500, preferably 20 to 200.

The atomic ratio ($Al_C/Al_{a-2}$) of the aluminum atoms ($Al_C$) in the component [C-2] optionally used to the aluminum atoms ($Al_{a-2}$) in the component (a-3) is usually 0.02 to 3, preferably 0.05 to 1.5. The compound (a-1), (a-2) and (a-3), and if necessary the compound [C-2] are mixed at a temperature of usually $-50°$ to $150°$ C., preferably $-20°$ to $120°$ C., with a contact time of 1 to 1000 minutes, preferably 5 to 600 minutes. The component (a-1) is contacted with the component (a-2) at the temperature of usually $50°$ to $150°$ C., preferably $60$ to $120°$ C. with a contact time of 0.5 to 1000 hours, preferably 1 to 500 hours.

In the first olefin polymerization solid catalyst of the present invention obtained as described above, the transition metal is supported in an amount of $5\times10^{-6}$ to $5\times10^{-4}$ g atom, preferably $10^{-5}$ to $2\times10^{-4}$ g atom, and aluminum is supported in an amount of $10^{-3}$ to $5\times10^{-2}$ g atom, preferably $2\times10^{-3}$ to $2\times10^{-2}$ g atom, all the amounts being based on 1 g of the component (a-1).

The first olefin polymerization catalyst of the invention may be used after prepolymerizing olefin in the presence of this catalyst and, if necessary, the component [C-1]. In the prepolymerization, the transition metal compound (a-3) is used in an amount of $10^{-6}$ to $2\times10^{-2}$ mol/l, preferably, $5\times10^{-5}$ to $10^{-2}$. The prepolymerization is carried out at the temperature of $-20°$ to $80°$ C., preferably $0°$ to $50°$ C., with the time of 0.5 to 100 hours, preferably 1 to 50 hours.

Though olefin used in the prepolymerization is selected from the olefin used in the polymerization, ethylene is preferably used for the main ingredient of olefins to be prepolymerized.

Furthermore, an amount of prepolymerized polyolefin produced in the prepolymerization is, based on 1 g of the compound (a-1), from about 0.1 to 500 g, preferably 0.3 to 300 g, particularly preferably 1 to 100 g. When the first olefin polymerization solid catalyst is prepolymerized as described above, the transition metal is supported in an amount of $5\times10^{-6}$ to $5\times10^{-4}$ g atom, preferably $10^{-5}$ to $2\times10^{-4}$ g atom, and aluminum is supported in an amount of about $10^{-3}$ to $5\times10^{-2}$ g atom, preferably $2\times10^{-3}$ to $2\times10^{-2}$ g atom, all the amounts being based on 1 g of the compound (a-1).

In the present invention, the prepolymerization can be practiced either by batch process, semi-continuous process or continuous process.

When olefin is polymerized in the presence of the first olefin polymerization solid catalyst, the first solid catalyst containing prepolymerized polyolefin, and the first olefin polymerization catalyst of the invention, the transition metal compounds (a-3) is desirably used in an amount (per liter of the polymerization volume) of usually $10^{-8}$ to $10^{-3}$ g atom, preferably $10^{-7}$ to $10^{-4}$ g atom in terms of the transition metal. Though, in the first olefin polymerization catalyst of the invention, the organoaluminum compound [C-2] may be used with the solid catalyst component [A-1], the first olefin polymerization solid catalyst of the invention may be used with aluminoxiane compound if necessary. The aluminoxiane compound and the organoaluminum compound [C-2] is used in an amount of 0 to 500 moles, preferably 5 to 200 moles based on 1 g atom of the transition metal.

The second olefin polymerization solid catalyst of the invention may be prepared by mixing the particulate carrier (a-1) and the organoaluminum oxy-compound (a-2), which compose the solid catalyst component [A-2], the transition metal compound of the metal belonging to the group IVB of the periodic table containing a ligand having the cyclopentadienyl skeleton [B] and if necessary the compound [C-1] in inert hydrocarbon solvent, introducing olefin to the resulting mixture, and carryfhg out prepolymerization.

As the inert hydrocarbon solvent used in the preparation of the second polymerization solid catalyst, there may be mentioned the same solvent as exemplified in the preparation of the first polymerization solid catalyst.

The contact of the components (a-1) and (a-2), which compose the solid catalyst component [A-2], and the catalyst components [B] and [C-1] may be conducted in an arbitrarily selected order to prepare the first olefin polymerization catalyst, as far as the solid catalyst component [A-2] is produced as an intermediate product. When at least two kind of the transition metal compound [B] are used, it is preferred that the transition metal components [B] are previously mixed together.

Figure 3:
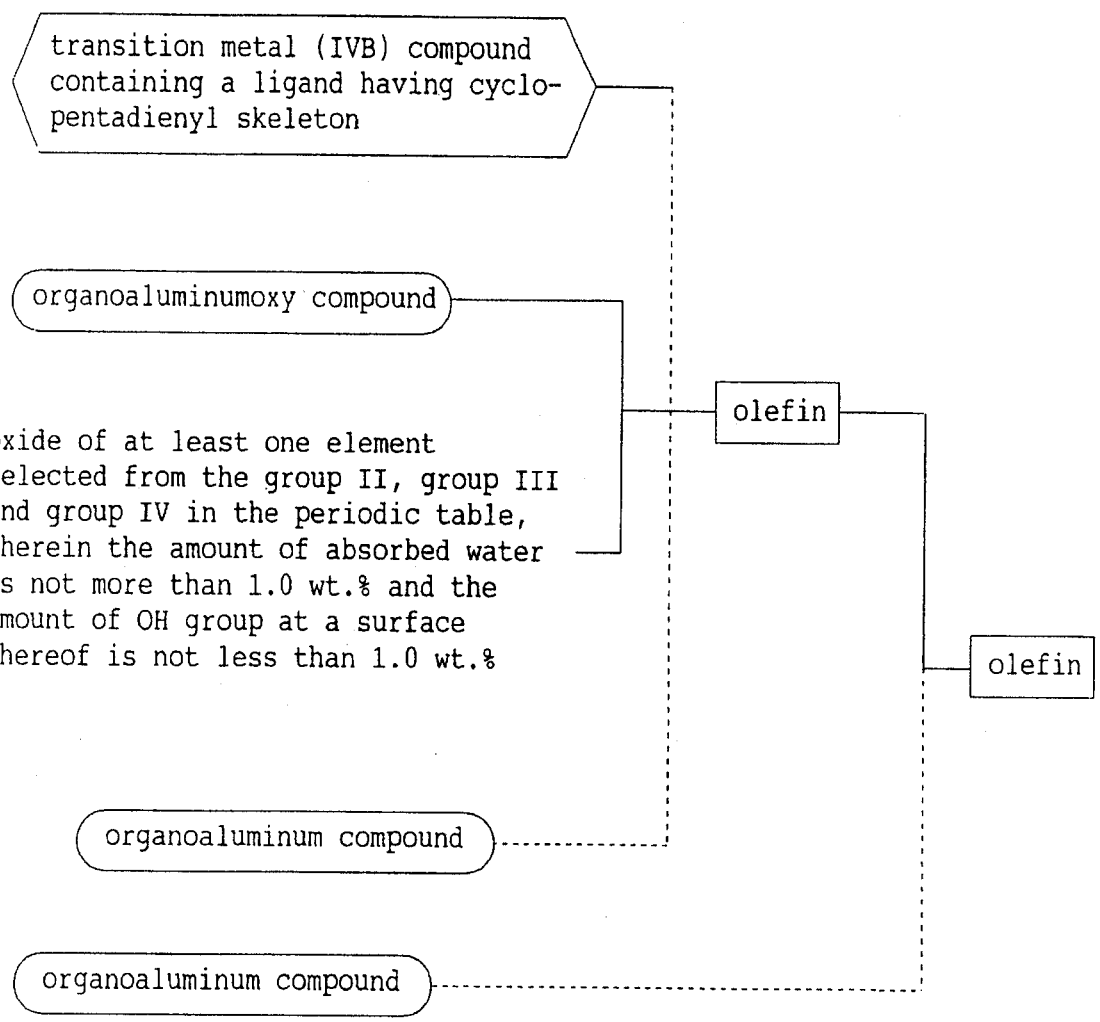
FIG. 3 is a diagram for a preparation of the second olefin polymerization catalyst according to the present invention.
Figure 4:
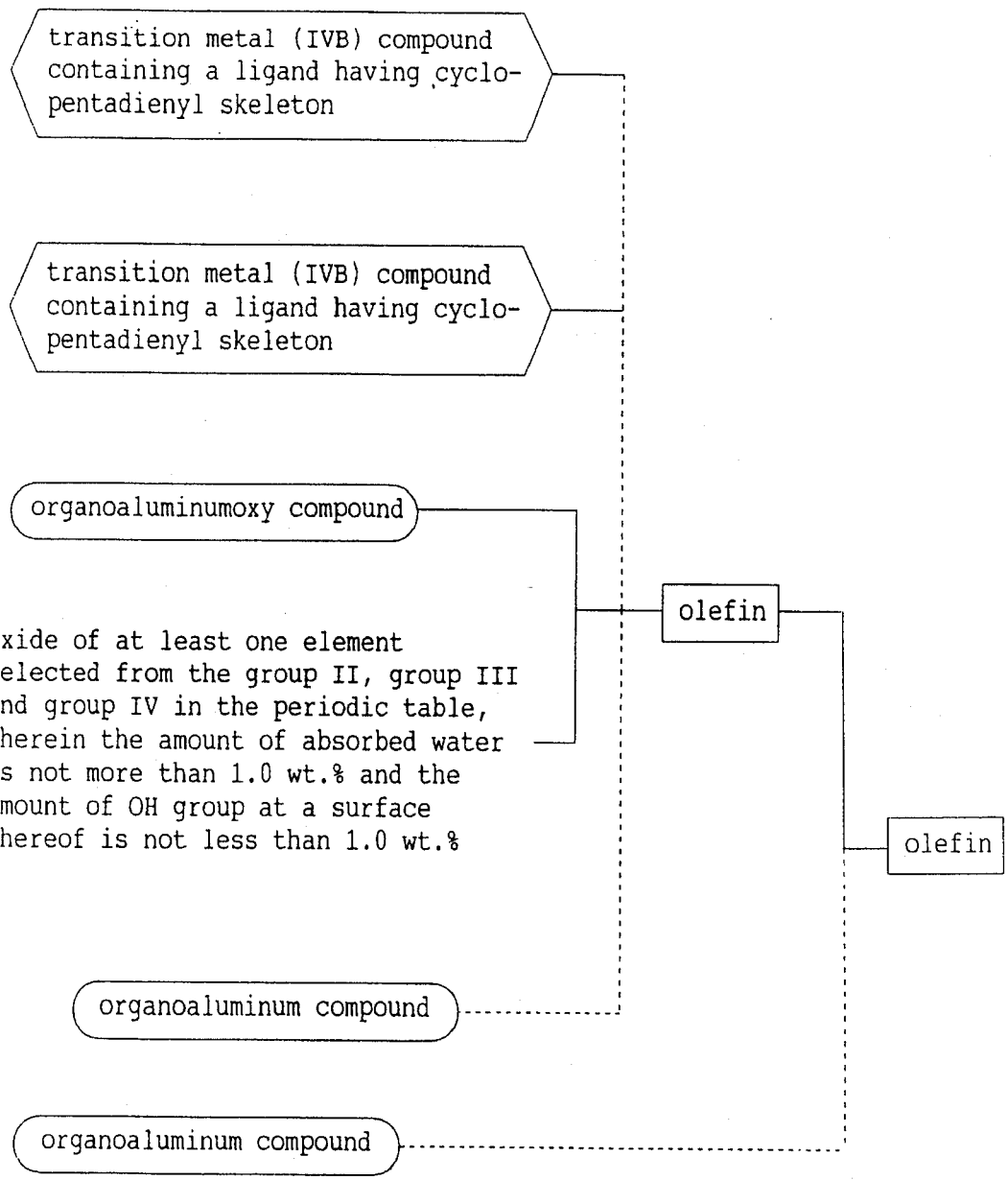
FIG. 4 is the other diagram for a preparation of the second olefin polymerization catalyst according to the present invention.

In each of FIGS. 3 and 4, a diagram for the preparation of the second olefin polymerization catalyst is shown.

The preferred preparations of the first olefin polymerization catalyst are exemplified as follows;

the particulate carrier (a-1) and the organoaluminum oxy-compound (a-2), which compose the solid catalyst component [A-2], are mixed and contacted, followed by mixing and contacting the transition metal compound [B] and, if necessary, the organoaluminum compound [C-1] is mixed thereto;

The particulate carrier (a-1) and the organoaluminum oxy-compound (a-2), which compose the solid catalyst component [A-2], are mixed and contacted, followed by mixing and contacting the transition metal compound [B] and, if necessary, the organoaluminum compound [C-1] are mixed thereto in this order;

the particulate carrier (a-1) is mixed and contacted with the organoaluminum oxy-compound (a-2), and the organoaluminum compound [C-1] and the transition metal compound [B] are mixed thereto in this order.

When the compounds (a-1) and (a-2), which compose the solid catalyst component [A-2], the catalyst component [B] and, if necessary, the component [C-1] are mixed and contacted, the compound (a-2) is used usually in an amount of $5\times10^{-4}$ to $2\times10^{-2}$ mol, preferably $10^{-3}$ to $10^{-2}$ mol based on 1 g of the compound (a-1), and the concentration thereof is $5\times10^{-2}$ to 2 mol/l, preferably 0.1 to 1 mol/l. The atomic ratio [OH/$Al_{a-2}$] of the surface hydroxyl group of the component (a-1) to the component (a-2) is usually 0.1 to 0.5, preferably 0.15 to 0.4.

The atomic ratio [Al/(transition metal)] of the aluminum in the component (a-2) to the transition metal in the component [B] is usually 10 to 500, preferably 20 to 200.

The atomic ratio (AlC/$Al_{a-2}$) of the aluminum atoms ($Al_C$) in the component [C-1] optionally used to the aluminum atoms ($Al_{a-2}$) in the component (a-2) is usually 0.02 to 3, preferably 0.05 to 1.5.

The compounds (a-1) and (a-2), which compose the solid catalyst component [A-2], the catalyst component [B] and, if necessary, the compound [C-1] are mixed at a temperature of usually $-50°$ to $150°$ C. preferably $-20°$ to $120°$ C., with a contact time of 0.5 to 1000 hours, preferably 1 to 500 hours. Especially, when the components (a-1) and (a-2) are contacted at the temperature of usually $50°$ to $150°$ C., preferably $60°$ to $120°$ C., with a contact time of 0.5 to 1000 hours, preferably 1 to 500 hours.

In the invention, the second olefin polymerization solid catalyst may be obtained by prepolymerizing olefin in the presence of the solid catalyst component [A-2] obtained as described above, the transition metal compound of the metal belonging to the group IVB of the periodic table containing a ligand having the cycropentadienyl skeleton [B] and, if necessary, the compound [C-1] in inert hydrocarbon solvent. In the prepolymerization, the transition metal compound [B] is used in an amount of $10^{-5}$ to $2\times10^{-2}$ mol/l, preferably, $5\times10^{-5}$ to $10^{-2}$. The prepolymerization is carried out at the temperature of $-20°$ to $80°$ C. preferably $0°$ to $50°$ C. with the time of 0.5 to 100 hours, preferably 1 to 50 hours.

Though olefin used in the prepolymerization is selected from the olefin used in the polymerization, ethylene is preferably used for the main ingredient of olefins to be prepolymerized.

In the second olefin polymerization solid catalyst obtained as described above, the transition metal is supported in an amount of $5\times10^{-6}$ to $5\times10^{-4}$ g atom, preferably $10^{-5}$ to $2\times10^{-4}$ g atom, and aluminum is supported in an amount of about $10^{-3}$ to $5\times10^{-2}$ g atom, preferably $2\times10^{-3}$ to $2\times10^{-2}$ g atom, all the amounts being based on 1g of the compound (a-1).

Furthermore, an amount of prepolymerized polyolefin produced in the prepolymerization is, based on 1 g of the compound (a-1), from about 0.1 to 500 g, preferably 0.3 to 300 g, particularly preferably 1 to 100g.

When olefin is polymerized in the presence of the second olefin polymerization solid catalyst of the invention, the transition metal compounds [B] is desirably used in an amount (per liter of the polymerization volume) of usually $10^{-8}$ to $10^{-3}$ g atom, preferably $10^{-7}$ to $10^{-4}$ g atom in terms of the transition metal. In the polymerization, the second olefin polymerization solid catalyst of the invention may be used with the organoaluminum compound [C-2] and/or aluminoxane compound if necessary. As the preferred organoaluminum compound, there can be exemplified the same compound as the organoaluminum compound [C-1] as described above. The aluminoxiane compound and the organoaluminum compound [C-2] are used in an amount of 0 to 500 moles, preferably 5 to 200 moles based on 1 g atom of the transition metal.

The olefins which can be polymerized with such the first and second olefin polymerization solid catalysts or the catalysts obtained by using them include ethylene and olefins each having 3 to 20 carbon atoms, for example, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-norbornene, tetracyclododecene, 2-methyl-1,4,5,8-dimethano-1,2,3,4,4a,5,8,8a-octahydronaphthalene. In addition, styrene, vinylcyclohexane and dienes may also be employed.

The polymerization of the present invention can be practiced either in a liquid phase polymerization such as suspension polymerization, or a gas phase polymerization.

In the process for liquid phase polymerization, the same inactive hydrocarbon solvent as employed in the catalyst preparation can be used, and the olefin itself can also be used as a solvent.

The olefin polymerization is carried out in the presence of the catalyst as described above for olefin polymerization at a temperature of usually $-50°$ to $150°$ C., preferably $0°$ to $100°$ C., at a pressure of usually an atmospheric pressure to 100 kg/cm², preferably an atmospheric pressure to 50 kg/cm². The polymerization reaction can be carried out either batch-wise, semicontinuously or continuously. Moreover, the polymerization may also be carried out in two or more steps having different reaction conditions from each other. The molecular weight of the produced polyolefin can be adjusted either by introducing hydrogen in the polymerization system, or by changing the polymerization temperature.

Moreover, the olefin polymerization catalysts of the present invention may contain the component other than the above-mentioned components and useful for the olefin polymerization.

EFFECT OF THE INVENTION

The first olefin polymerization solid catalyst according to the present invention is composed of a solid catalyst component [A-1] wherein (a-2) an organoaluminum oxy compound and (a-3) a transition metal compound of a metal belonging to the group IVB of the periodic table containing a ligand having a cyclopentadienyl skeleton are supported on (a-1) a particulate carrier composed of (i) an oxide of at least one element selected from among those belonging to the groups of II, III and IV of the periodic table, and containing (ii) less than 1.5% by weight of water and (iii) at least 1.5% by weight of surface hydroxyl groups.

The first olefin polymerization catalyst according to the present invention may be composed of the first solid catalyst component [A-1] with a catalyst component [C-2] being a organoaluminum compound.

The first olefin polymerization solid catalyst and the first olefin polymerization catalyst according to the present invention is applicable to a suspension polymerization and a vapor phase polymerization, and capable of preparing spherical olefin polymers excellent in particle characteristics at high polymerization activity and, moreover, of giving olefin polymers a narrow molecular weight distribution when two or more monomers are polymerized.

Furthermore, according to the first olefin polymerization solid catalyst of the present invention, when said transition metal compound (a-3) includes at least two kinds of transition metal compounds, the solid catalyst is applicable to a suspension polymerization and a vapor phase polymerization, and capable of preparing spherical olefin polymers excellent in particle characteristics at high polymerization activity and, moreover, of giving olefin polymers excellent melt tension, a broad molecular weight distribution and excellent moldability.

The second olefin polymerization solid catalyst according to the present invention may be formed by prepolymerizing olefin in the presence of [A-2] a solid catalyst component, in which the component (a-2) are supported on the component (a-1), [B] a catalyst component being a transition metal compound of a metal belonging to the group IVB of the periodic table containing a ligand having a cyclopentadienyl skeleton, and, if necessary [C-1] a catalyst component being an organoaluminum compound.

The second olefin polymerization catalyst according to the present invention may be composed of the second olefin polymerization solid catalyst with a catalyst component [C-2] being a organoaluminum compound.

The second olefin polymerization solid catalyst and the second olefin polymerization catalyst according to the present invention is applicable to a suspension polymerization and a vapor phase polymerization, and capable of preparing spherical olefin polymers excellent in particle characteristics at high polymerization activity and, moreover, of giving olefin polymers a narrow molecular weight distribution when two or more monomers are polymerized.

Furthermore, according to the second olefin polymerization solid catalyst of the present invention, when said transition metal compound (a-3) includes at least two kinds of transition metal compounds, the solid catalyst is applicable to a suspension polymerization and a vapor phase polymerization, and capable of preparing spherical olefin polymers excellent in particle characteristics at high polymerization activity and, moreover, of giving olefin polymers excellent melt tension, a broad molecular weight distribution and excellent moldability.

EXAMPLES

The present invention will be illustrated below in more detail with reference to examples, but it should be construed that the invention is in no way limited to those examples.

The physical properties of the resulting ethylene polymer are determined as follows. [amount of n-decane solubule portion of polymer]

The amount of a n-decane soluble portion of the ethylene copolymer obtained by the present invention (the smaller is the amount of a n-decane portion, the narrower is the composition distribution of the copolymer) was measured by dissolving about 3 g of said ethylene copolymer in 450 ml of n-decane at 145° C., cooling the solution to 23° C., removing a n-decane insoluble portion by filtration, and recovering a ndecane soluble portion from the filtrate. [Density]

Density is that of a strand measured by using density gradient tube, said strand is prepared by heat-treating the strand at 120° C. for 1 hour and cooling it to room temperature for 1 hour, which have been used for the measurement of MFR at 190° C. under a load of 2.16 kg. [Average particle diameter and amount of fine power]

The average particle diameter and the amount of the fine powded of less than 100 µm are measured by using sieves. [Melt Tension (MT)]

The melt tension (MT) is determined by measuring the stress of a molten polymer while the polymer is being stretched at a constant rate. The measurement was carried out using a MT measuring apparatus (manufactured by Toyoseiki Seisakusho K.K.) having a nozzle diameter of 2.09 mm and a nozzle length of 8 mm at a resin temperature of 190° C., an extrusion rate of 10 mm/min and a take-up speed of 10 to 20 m/min.

During measurement of the melt tension, ethylene copolymer samples are premixed with 0.1% by weight of 2,6-di-tert-butyl-p-cresol, a crosslinking stabilizer.

EXAMPLE 1

[Preparation of solid catalyst (zirconium catalyst)]

A nitrogen purged 400 ml glass flask was charged with 13.1 g of silica (adsorbed water; not more than 0.1% by weight, hydroxyl group, 2.7% by weight), which was obtained by drying silica (TG-20643, a product of Fuji Devison Co.) under a nitrogen stream at 200° C. for 6 hours, and 150 ml of toluene to obtain a suspension, followed by cooling to 0° C. To the suspension was added dropwise over a period of 1 hour 55.1 ml of a toluene solution of an organoaluminum oxy compound (Al; 1.365 mol/l), which was prepared by resolving dried methylaluminoxane of Scheting Co. in toluene, while the temperature of the reaction system was maintained at 0° C. Subsequently, reaction was carried out at 0° C. for 1 hour, at room temperature for 1 hour and at 80° C. for 4 hours. After the reaction was finished, the suspension was cooled to 20° C. and, to the suspension, was added dropwise 31.3 ml of a toluene solution of bis(n-butylcyclopentadienyl)zirconium dichloride (Zr: 0.0380 mol/l) over a period of 45 minutes. After the completion of the dropping, the temperature of the suspension was elevated to 30° C., followed by stirring for 2 hours at this temperature. Thereafter, the solvent was removed by decantation and the residue was washed with 250 ml of toluene. The washing treatment was totally carried out three time to obtain the solid catalyst containing, based on g of silica, 8.3 mg of Zr and 155 mg of Al. The solid catalyst was used for polymerization after resolving it in hexane.

[Ethylene/1-butene copolymerization]

In a thoroughly nitrogen-purged 2-liter stainless steel autoclave was placed 150 g of sodium chloride (a special grade of Wako Junyaku K.K.) followed by vacuum drying at 90° C. for 1 hour. Thereafter, a mixed gas comprising ethylene and 1-butene (1-butene content was 5.0 mol %) was introduced into the autoclave to reduce the pressure inside the system to ordinary pressure and the temperature inside the system was decreased to 70° C.

Subsequently, the autoclave was charged with 0.5 mmols of triisobutylaluminum and 0.003 mmols in terms of Zr atom of the solid catalyst obtained above.

Into the autoclave was introduced 10 Nml of hydrogen and then was introduced the above-mentioned mixed gas to begin polymerization under a total pressure of 8 kg/cm$^2$-G. The temperature in the polymerization system was immediately elevated to 80° C.

Thereafter, the polymerization was carried out for 1 hour by charging only the mixed gas and maintaining the total pressure of 8 kg/cm$^2$-G and the temperature of the system at 80° C.

After the completion of the polymerization, unaltered sodium chloride was removed by water-washing, and the remaining polymer was washed with methanol, followed by vacuum drying at 80° C. overnight. There was obtained 237 g of ethylene/1-butene copolymer having 4.92 g/10 min. of MFR measured at the temperature of 190° C. under the load of 2.16 kg, 0.912 g/cm$^3$ of density, 0.7% by weight of a n-decane soluble portion at 23° C., 0.41 g/cm$^3$ of the bulk density, 850 µm of the average diameter of the polymer particle and 0.8% by weight of the fine powder of less than 100 µm.

EXAMPLE 2

[Preparation of solid catalyst (zirconium catalyst)

There are mixed 6.5 g of the same silica as used in Example 1 with 125 ml of toluene to form a suspension, followed by cooling to 0° C. To the suspension was added dropwise a mixture of 32.2 ml of a toluene solution of an organoaluminum oxy compound (Al; 1.157 mol/l), which was prepared by resolving dried methylaluminoxane of Scheling Co. in toluene and 11.9 ml of a toluene solution of bis(n-butylcyclopentadienyl)zirconium dichloride (Zr: 0.0313 mol/l) over a period of 50 minutes, while the temperature of the reaction system was maintained at 0° C. Subsequently, reaction was carried out at 0° C for 30 minutes, at room temperature for 40 minutes and at 80° C. for 3.5 hours.

After the reaction was finished, the solvent of the suspension was removed by decantation and the residue was washed with 250 ml of toluene. The washing treatment was totally carried out three times to obtain the solid catalyst containing, based on 1 g of silica, 5.2 mg of Zr and 154 mg of Al.

[Ethylene/1-butene copolymerization]

The same procedure of ethylene/1-butene copolymerization as in Example 1 was repeated except that there was used the solid catalyst obtained above as it is, the 1-butene content of the mixed gas was 8.2 mol %, the amount of hydrogen introduced was 30 Nml and the polymerization temperature was 75° C. to obtain 190 g of ethylene/1-butene copolymer having 4.92 g/10 min. of MFR measured at the temperature of 190° C. under the load of 2.16 kg, 0.900 g/cm$^3$ of density, 4.6% by weight of the n-decane soluble portion at 23° C., 0.39 g/cm$^3$ of the bulk density, 870 μm of the average diameter of the polymer particle and 0.1% by weight of the fine powder of less than 100 μm.

EXAMPLE 3

[Preparation of solid catalyst (zirconium catalyst)]

There are mixed 7.4 g of silica (adsorbed water; not more than 0.1 % by weight, surface hydroxyl group; 2.1 % by weight), which was obtained by drying under a nitrogen stream at 300° C. for 6 hours, with 150 ml of toluene to form a suspension, followed by cooling the suspension to 0° C. Thereafter, the same procedure as in Example 1 was repeated except that the organoaluminum oxy compound and bis(n-butylcyclopentadienyl) zirconium chloride were respectively used in amounts of 34.8 mmol and 0.465 mmol to obtain the solid catalyst containing, based on 1 g of silica, 5.7 mg of Zr and 125 mg of Al. The solid catalyst was used for polymerization after resolving it in hexane.

[Ethylene/1-butene copolymerization]

The same procedure of ethylene/1-butene copolymerization as in Example 1 was repeated except that there was used the solid catalyst obtained above to obtain 211 g of ethylene/1-butene copolymer having 4.10 g/10 min. of MFR measured at the temperature of 190° C. under the load of 2.16 kg, 0.910 g/cm$^3$ of density, 0.8 % by weight of the n-decane soluble portion at 23° C. 0.38 g/cm$^3$ of the balk density 740 μm of the average diameter of the polymer particle and 0.6% by weight of the fine powder of less than 100 μm.

EXAMPLE 4

[Preparation of solid catalyst (zirconium catalyst)]

There are mixed 0.119 mg atom in terms of zirconium atom of the solid catalyst obtained in Example 1 with 100 ml of hexane to form a suspension.

To the suspension was added 8.15 mmols of triisobutyl aluminum followed by stirring for 10 minutes. Subsequently, there was continuously introduced ethylene gas to carry out the prepolymerization at 35° C. for 80 minutes. In result, the solid catalyst containing, based on 1 g of silica, 4 g of polyethylene was obtained. In the prepolymerization, the prepolymerized catalyst adhered to the wall of the prepolymerization reactor was not observed.

After the completion of the prepolymerization, the resulting mixture was made up to 200 ml with hexane and the mixture obtained was used for the polymerization as it is.
[Ethylene/1-butene copolymerization]

The same procedure of ethylene/1-butene copolymerization as in Example 1 was repeated except that the 1-butene content of the mixed gas was 4.3 mol % to obtain 204 g of ethylene/1-butene copolymer having 4.11 g/10 min. of MFR measured at the temperature of 190° C. under the load of 2.16 kg, 0.912 g/cm$^3$ of density, 0.4% by weight of the n-decane soluble portion at 23° C., 0.41 g/cm$^3$ of the bulk density, 770 μm of the average diameter of the polymer particle and 0.1% by weight of the fine powder of less than 100 μm.

EXAMPLE 5

[Preparation of solid catalyst (zirconium catalyst)]

The same procedure as in Example 4 was repeated except that the prepolymerization was carried out so that the resulting solid catalyst contained, based on 1 g of silica, 13 g of polyethylene. In the prepolymerization, the prepolymerized catalyst adhered to the wall of the prepolymerization reactor was not observed.

[Ethylene/1-butene copolymerization]

The same procedure of ethylene/1-butene copolymerization as in Example 4 was repeated except that there was used the prepolymerized catalyst as obtained above to obtain 255 g of ethylene/1-butene copolymer having 4.24 g/10 min. of MFR measured at the temperature of 190° C. under the load of 2.16 kg, 0.911 g/cm$^3$ of density, 0.8% by weight of the n-decane soluble portion at 23° C., 0.41 g/cm$^3$ of the bulk density, 870 μm of the average diameter of the polymer particle and 0% by weight of the fine powder of less than 100 μm.

EXAMPLE 6

[Preparation of solid catalyst (zirconium catalyst)]

The same procedure as in Example 4 was repeated except that the prepolymerization was carried out so that the resulting solid catalyst contained, based on 1 g of silica, 80 g of polyethylene. In the prepolymerization, the prepolymerized catalyst adhered to the wall of the prepolymerization reactor was not observed.

[Ethylene/1-butene copolymerization]

The same procedure of ethylene/1-butene copolymerization as in Example 4 was repeated except that there was used the prepolymerized catalyst as obtained above and the 1-butene content was 4.7 mol % to obtain 246 g of ethylene/1-butene copolymer having 3.41 g/10 min. of MFR measured at the temperature of 190° C. under the load of 2.16 kg, 0.912 g/cm$^3$ of density, 0.7% by weight of the n-decane soluble portion at 23° C., 0.39 g/cm$^3$ of the bulk density, 860 μm of the average diameter of the polymer particle and 0% by weight of the fine powder of less than 100 μm.

EXAMPLE 7

[Preparation of solid catalyst (zirconium catalyst)]

There are mixed 0.116 mg atom in terms of Zr atom of the solid catalyst obtained in Example 2 with 100 ml of hexane to form a suspension.

To the suspension was added 10.1 mmols of triisobutyl aluminum followed by stirring for 5 minutes. Subsequently, there was continuously introduced ethylene gas to carry out the prepolymerization at 30° C. for 5 hours.

The prepolymerization was finished, the solvent was removed by decantation and the residue was washed with 150 ml of hexane. The washing treatment was totally carried out three times to obtain the solid catalyst containing, based on 1 g of silica, 4.9 mg of Zr, 154 mg of Al and 7 g of polyethylene.

[Ethylene/1-butene copolymerization]

The same procedure of ethylene/1-butene copolymerization as in Example 2 was repeated except that there was used the solid catalyst as prepared above to obtain 269 g of ethylene/1-butene copolymer having 3.36 g/10 min. of MFR measured at the temperature of 190° C. under the load of 2.16 kg, 0.898 g/cm$^3$ of density, 6.1% by weight of the n-decane soluble portion at 23° C., 0.43 g/cm$^3$ of the bulk density, 830 μm of the average diameter of the polymer particle and 0% by weight of the fine powder of less than 100 μm.

Comparative Example 1

[Preparation of solid catalyst (zircon lure catalyst)]

There was mixed 3.9 g of silica (adsorbed water; not more than 0.1% by weight, hydroxyl group content; 0.5% by weight), which was obtained by sintering under a nitrogen stream at 700° C. for 6 hours, with 100 ml of toluene to obtain a suspension, followed by cooling to 0° C. To the suspension was added dropwise over a period of 30 minutes 16.4 ml of a toluene solution of an organoaluminum oxy compound (Al; 1.365 mol/l), which was prepared as in Example 1, while the temperature of the reaction system was maintained at 0° C.

Subsequently, reaction was carried out at 0° C. for 1 hour, at room temperature for 1 hour and at 80° C for 4 hours. After the reaction was finished, the suspension was cooled to 20° C. and, to the suspension, was added dropwise 9.32 ml of a toluene solution of bis (n-butylcyclopentadienyl) zirconium dichloride (Zr: 0.0380 mol/l) over a period of 15 minutes. After the completion of the dropping, the temperature of the suspension was elevated to 30° C., followed by stirring for 2 hours at this temperature. Thereafter, the same procedure as in Example 1 was repeated to obtain the solid catalyst containing, based on 1 g of silica, 8.1 mg of Zr and 150 mg of Al. The solid catalyst was used for polymerization after resolving it in hexane.

[Ethylene/1-butene copolymerization]

The same procedure of ethylene/1-butene copolymerization as in Example 1 was repeated except that there was used the suspension of the solid catalyst as obtained above to obtain 195 g of ethylene/1-butene copolymer having 4.55 g/10 min. of MFR measured at the temperature of 190° C. under the load of 2.16 kg, 0.913 g/cm$^3$ of density, 6.1% by weight of the ndecane soluble portion at 23° C., 0.40 g/cm$^3$ of the bulk density, 720 μm of the average diameter of the polymer particle and 1.6% by weight of the fine powder of less than 100 μm.

Comparative Example 2

[Ethylene/1-butene copolymerization]

The same procedure of ethylene/1-butene copolymerization as in Example 1 was repeated except that, in place of solid catalyst, there were respectively added to the autoclave 0.19 mg atom in terms of Al atom of the organoaluminum oxy compound supported on silica and 1 ml of the toluene solution of bis(n-butylcyclopentadienyl) zirconium chloride (Zr; 0.003 mmol/l) as prepared in Example 1 to obtain 45 g of ethylene/1-butene copolymer having 7.01 g/10 min. of MFR measured at the temperature of 190° C. under the load of 2.16 kg, 0.915 g/cm$^3$ of density and 0.19 g/cm$^3$ of the bulk density. There was observed the polymer adhered on the wall of the autoclave and many polymer particles having indeterminate forms.

Comparative Example 3

[Preparation of solid catalyst (zirconium catalyst)]

There was mixed the silica dried as in Example 1 with 3.6% by weight of water to make thoroughly dispersed. The silica weighted 9.6 g was mixed with 150 ml of toluene to obtain a suspension, followed by cooling to 0° C. To the suspension was added dropwise over a period of 50 minutes 40.4 ml of a toluene solution of an organoaluminum oxy compound (Al; 1.365 mol/l), which was prepared as in Example 1, while the temperature of the reaction system was maintained at 0° C. Subsequently, reaction was carried out at 0° C for 1 hour, at room temperature for 1 hour and at 80° C. for 4.5 hours. After the reaction was finished, the suspension was cooled to 20° C. and, to the suspension, was added dropwise 22.9 ml of a toluene solution of bis(n-butylcyclopentadienyl)zirconium dichloride (Zr: 0.0380 mol/l) over a period of 45 minutes. After the completion of the dropping, the temperature of the suspension was elevated to 0° C., followed by stirring for 2 hours at this temperature.

After the reaction was finished, the solvent of the suspension was removed by decantation and the residue was washed with 250 ml of toluene. The washing treatment was totally carried out three times to obtain the solid catalyst containing, based on 1 g of silica, 8.0 mg of Zr and 150 mg of Al. The solid catalyst was used for polymerization after resolving it in hexane.

[Ethylene/1-butene copolymerization]

The same procedure of ethylene/1-butene copolymerization as in Example 1 was repeated except that there was used the suspension of the solid catalyst as obtained above to obtain 177 g of ethylene/1-butene copolymer having 3.98 g/10 min. of MFR measured at the temperature of 190° C. under the load of 2.16 kg, 0.914 g/cm$^3$ of density, 0.37 g/cm$^3$ of the bulk density, 610 μm of the average diameter of the polymer particle and 2.5% by weight of the fine powder of less than 100 μm.

EXAMPLE 8

[Preparation of solid catalyst (zirconium catalyst)]

There was mixed 5.5 g of the same silica as in Example 1 with 60 ml of toluene to obtain a suspension, followed by cooling to 0° C. To the suspension was added dropwise over a period of 30 minutes 28.5 ml of a toluene solution of an organoaluminum oxy compound (Al; 1.465 mol/l), which was prepared as in Example 1 After the completion of the dropping, the reaction was carried out as in Example 1. After the reaction was finished, the reaction mixture was cooled to 20° C. and to the mixture, 14.8 ml of a toluene solution of bis(n-butylcyclopentadienyl) zirconium chloride (Zr; 0.0313 mol/l) was added dropwise over a period of 20 minutes. After the completion of dropping, the reaction system was elevated to 30° C. and stirred for 100 minutes at the temperature. Thereafter, the same procedure as in Example 1 was repeated to obtain the solid catalyst containing, based on 1 g of silica, 7.5 mg of Zr and 200 mg of Al.

There was added 100 ml of hexane to 50 ml of a suspension (Zr; 0.00231 mol/l) of the solid catalyst thus obtained in hexane and, to the resulting suspension, there was added 10.4 mmols of triisobutyl aluminum, followed by stirring for 10 minutes. Subsequently, there was continuously introduced ethylene gas to carry out the prepolymerization at 30° C. for 7 hours. In the prepolymerization, the prepolymerized catalyst adhered to the wall of the prepolymerization reactor was not observed. Thereafter, the solvent of the reaction mixture was removed by decantation and the residue was washed with 200 ml of toluene. The washing treatment was totally carried out four times to obtain the prepolymerized solid catalyst containing, based on 1 g of silica, 7.0 mg of Zr, 196 mg of Al and 28 g of polyethylene. The solid catalyst was used for polymerization after resolving it in hexane.

[Ethylene/1-butene copolymerization]

The same procedure of ethylene/1-butene copolymerization as in Example 1 was repeated except that the 1-butene content of the mixed gas was 8.2 mol%. the amount of hydrogen introduced was 30 Nml, the polymerization temperature was 75° C. to obtain 248 g of ethylene/1-butene copolymer having 3.04 g/10 min. of MFR measured at the temperature of 190° C. under the load of 2.16 kg, 0.899 g/cm$^3$ of density, 0.39 g/cm$^3$ of the bulk density, 940 μm of the average diameter of the polymer particle and 0% by weight of the fine powder of less than 100 μm.

EXAMPLE 9

[Preparation of solid catalyst (zirconium catalyst)]

The same procedure as in Example 1 was repeated except that, as the Zr compound, there was used bis (indenyl)zirconium chloride to obtain the solid catalyst containing, based on 1 g of silica, 8.1 mg of zirconium and 152 mg of aluminum.

[Ethylene/1-butene copolymerization]

The same procedure of ethylene/1-butene copolymerization as in Example 1 was repeated except that there was used the solid catalyst as prepared above to obtain 185 g of ethylene/1-butene copolymer having 6.10 g/10 min. of MFR measured at the temperature of 190° C. under the load of 2.16 kg, 0.913 g/cm$^3$ of density, 0.40 g/cm$^3$ of the bulk density, 780 μm of the average diameter of the polymer particle and 0.7% by weight of the fine powder of less than 100 μm.

EXAMPLE 10

[Ethylene/1-butene copolymerization]

The same procedure of ethylene/1-butene copolymerization as in Example 1 was repeated except that there was not used triisobutyl aluminum to obtain 95 g of ethylene/1-butene copolymer having 6.63 g/10 min. of MFR measured at the temperature of 190° C. under the load of 2.16 kg, 0.916 g/cm$^3$ of density, 0.39 g/cm$^3$ of the bulk density, 610 μm of the average diameter of the polymer particle and 0.8% by weight of the fine powder of less than 100 μm.

EXAMPLE 11

[Preparation of solid catalyst (zirconium catalyst)]

The same procedure as in Example 1 was repeated except that, in place of bis(n-butylcyclopentadienyl) zirconium chloride, there was used bis(1,3-dimethylcyclopentadienyl) zirconium chloride to obtain the solid catalyst containing, based on 1 g of silica, 8.1 mg of zirconium and 154 mg of aluminum.

[Ethylene/1-butene copolymerization]

The same procedure of ethylene/1-butene copolymerization as in Example 1 was repeated except that there was used 0.005 mg atom in terms of Zr atom of the solid catalyst as prepared above to obtain 245 g of ethylene/1-butene copolymer having 0.032 g/10 min. of MFR, 0.40 g/cm$^3$ of the bulk density, 690 μm of the average diameter of the polymer particle and 0.6% by weight of the fine powder of less than 100 μm.

The results in the preparation of the catalysts and the polymerization are respectively shown in Tables 1 and 2.

TABLE 1

| | Component (a-1) | | | Component (a-2) | Component (a-3) | | OH | Element and polyolefin supported on carrier* | | |
|---|---|---|---|---|---|---|---|---|---|---|
| | (i) (g) | (ii) (% by weight) | (iii) (% by weight) | (mmol in terms of Al atom) | Transition metal compound | (mmol in terms of Zr atom) | $Al_{a-2}$ (mol ratio) | Zr (mg) | Al (mg) | PE (g) |
| Ex. 1 | 13.1 | <0.1 | 2.7 | 75.2 | (n-BuCp)$_2$ZrCl$_2$ | 1.19 | 0.28 | 8.3 | 155 | 0 |
| Ex. 2 | 6.5 | <0.1 | 2.7 | 37.3 | (n-BuCp)$_2$ZrCl$_2$ | 0.372 | 0.28 | 5.2 | 154 | 0 |
| Ex. 3 | 7.4 | <0.1 | 2.1 | 34.8 | (n-BuCp)$_2$ZrCl$_2$ | 0.465 | 0.26 | 5.7 | 125 | 0 |
| Ex. 4 | 13.1 | <0.1 | 2.7 | 75.2 | (n-BuCp)$_2$ZrCl$_2$ | 1.19 | 0.28 | — | — | 4 |
| Ex. 5 | 13.1 | <0.1 | 2.7 | 75.2 | (n-BuCp)$_2$ZrCl$_2$ | 1.19 | 0.28 | — | — | 13 |
| Ex. 6 | 13.1 | <0.1 | 2.7 | 75.2 | (n-BuCp)$_2$ZrCl$_2$ | 1.19 | 0.28 | — | — | 80 |
| Ex. 7 | 6.5 | <0.1 | 2.7 | 37.3 | (n-BuCp)$_2$ZrCl$_2$ | 0.372 | 0.28 | 4.9 | 154 | 7 |
| Ex. 8 | 5.5 | <0.1 | 2.7 | 41.8 | (n-BuCp)$_2$ZrCl$_2$ | 0.463 | 0.21 | 7.0 | 196 | 28 |
| Ex. 9 | 13.1 | <0.1 | 2.7 | 75.2 | Ind$_2$ZrCl$_2$ | 1.19 | 0.28 | 8.1 | 152 | 0 |
| Ex. 10 | 13.1 | <0.1 | 2.7 | 75.2 | (n-BuCp)$_2$ZrCl$_2$ | 1.19 | 0.28 | 8.3 | 155 | 0 |

TABLE 1-continued

| | Component (a-1) | | | Component (a-2) | Component (a-3) | | OH | Element and polyolefin supported on carrier* | | |
|---|---|---|---|---|---|---|---|---|---|---|
| | (i) (g) | (ii) (% by weight) | (iii) (% by weight) | (mmol in terms of Al atom) | Transition metal compound | (mmol in terms of Zr atom) | $Al_{a-2}$ (mol ratio) | Zr (mg) | Al (mg) | PE (g) |
| Ex. 11 | 13.1 | <0.1 | 2.7 | 75.2 | $(1,3\text{-Me}_2\text{Cp})_2\text{ZrCl}_2$ | 1.19 | 0.28 | 8.0 | 154 | 0 |
| Ex. 12 | 18.8 | 0.3 | 2.7 | 144 | $(1,3\text{-Me}_2\text{Cp})_2\text{ZrCl}_2$ | 0.141 | 0.21 | 4.5 | 176 | 0 |
| Ex. 13 | 18.8 | 0.3 | 2.7 | 144 | $(1,3\text{-Me}_2\text{Cp})_2\text{ZrCl}_2$ | 0.141 | 0.21 | 4.5 | 176 | 4 |
| Comp. Ex. 1 | 3.9 | <0.1 | 0.5 | 22.4 | $(n\text{-BuCp})_2\text{ZrCl}_2$ | 0.354 | 0.05 | 8.1 | 150 | 0 |
| Comp. Ex. 3 | 9.6 | 3.6 | 2.7 | 55.1 | $(n\text{-BuCp})_2\text{ZrCl}_2$ | 0.870 | 0.20 | 8.0 | 150 | 0 |

TABLE 2

| | 1-butene (mol %) | Polymerization temperature (°C.) | Zr (mg atom) | $(i\text{-Bu})_3\text{Al}$ (mmol) | Yield (g) | MFR (g/10 min) | Density (g/cm$^3$) | Amount of a n-decane soluble portion (% by weight) | Bulk density (g/cm$^3$) | Average diameter (μm) | Amounts of fine powder (% by weight) |
|---|---|---|---|---|---|---|---|---|---|---|---|
| Ex. 1 | 5.0 | 80 | 0.003 | 0.5 | 237 | 4.92 | 0.912 | 0.7 | 0.41 | 850 | 0.8 |
| Ex. 2 | 8.2 | 75 | 0.003 | 0.5 | 190 | 4.29 | 0.900 | 4.6 | 0.39 | 870 | 0.1 |
| Ex. 3 | 5.0 | 80 | 0.003 | 0.5 | 211 | 4.10 | 0.910 | 0.8 | 0.38 | 740 | 0.6 |
| Ex. 4 | 4.3 | 80 | 0.003 | 0.5 | 204 | 4.11 | 0.912 | 0.4 | 0.41 | 770 | 0.1 |
| Ex. 5 | 4.3 | 80 | 0.003 | 0.5 | 255 | 4.24 | 0.911 | 0.8 | 0.41 | 870 | 0 |
| Ex. 6 | 4.7 | 80 | 0.003 | 0.5 | 246 | 3.41 | 0.912 | 0.7 | 0.39 | 860 | 0 |
| Ex. 7 | 8.2 | 75 | 0.003 | 0.5 | 269 | 3.36 | 0.898 | 6.1 | 0.43 | 830 | 0 |
| Ex. 8 | 8.2 | 75 | 0.003 | 0.5 | 248 | 3.04 | 0.899 | — | 0.39 | 940 | 0 |
| Ex. 9 | 5.0 | 80 | 0.003 | 0.5 | 185 | 6.10 | 0.913 | — | 0.40 | 780 | 0.7 |
| Ex. 10 | 5.0 | 80 | 0.003 | 0 | 95 | 6.63 | 0.916 | — | 0.39 | 610 | 0.8 |
| Ex. 11 | 5.0 | 80 | 0.005 | 0.5 | 245 | 0.032 | — | — | 0.40 | 690 | 0.6 |
| Ex. 12 | 5.1 | 75 | 0.004 | 1.0 | 415 | 0.01> | — | — | 0.42 | 870 | 0.3 |
| Ex. 13 | 5.1 | 75 | 0.004 | 1.0 | 465 | 0.01> | — | — | 0.46 | 900 | 0 |
| Comp. Ex. 1 | 5.0 | 80 | 0.003 | 0.5 | 195 | 4.55 | 0.913 | — | 0.40 | 720 | 1.6 |
| Comp. Ex. 2 | 5.0 | 80 | * | * | 45 | 7.01 | 0.915 | — | 0.19 | — | — |
| Comp. Ex. 3 | 5.0 | 80 | 0.003 | 0.5 | 177 | 3.98 | 0.914 | — | 0.37 | 610 | 2.5 |

*Zr free from silica was used

EXAMPLE 12

[Preparation of solid catalyst (zirconium catalyst)]

A nitrogen purged 400 ml glass flask was charged with 18.8 g of silica (TG-40209, a product of Fuji Devison Co, adsorbed water; 0.3% by weight, hydroxyl group; 2.7% by weight) and 300 ml of toluene to obtain a suspension, followed by cooling to 0° C. To the suspension was added dropwize over a period of 1 hour 34.7 ml of a toluene solution of an organoaluminum oxy compound (a product of Schelling Co., Al; 4.16 mol/l), while the temperature of the reaction system was maintained at 0° C. Subsequently, reaction was carried out at 0° C. for 30 minutes and at 95° C. for 16 hours. After the reaction was finished, the suspension was cooled to 20° C. and, the solvent of the suspension was removed by decantation. The residue was washed with 300 ml of toluene three times.

The resulting solid component weighted 3.89 g was mixed with 70 ml of toluene to obtain a suspension and the temperature of the suspension was elevated to 80° C. To the suspension, there was added dropwise 15.1 ml of a toluene solution of bis(1,3-dimethylcyclopentadienyl)zirconium dichloride (Zr: 9.33 mmol/l) over a period of 20 minutes, followed by stirring at 80° C. for 2 hours. Thereafter, the solvent was removed by decantation and the residue was washed with 150 ml of hexane. The washing treatment was totally carried out three times to obtain the solid catalyst containing, based on 1 g of silica, 4.5 mg of Zr and 176 mg of Al. The solid catalyst was used for polymerization after resolving it in hexane.

[Ethylene/1-butene copolymerization]

In a thoroughly nitrogen-purged 2-liter stainless steel autoclave was placed 150 g of sodium chloride (a special grade of Wako Junyaku K.K.) followed by vacuum drying at 90° C. for 1 hour. Thereafter, a mixed gas comprising ethylene and 1-butene (1-butene content was 5.1 mol %) was introduced into the autoclave to reduce the pressure inside the system to ordinary pressure and the temperature inside the system was decreased to 75° C.

Subsequently, the autoclave was charged with 1 mmols of triisobutylaluminum and 0.004 mmols in terms of Zr atom of the solid catalyst obtained above. Into the autoclave was introduced 50 Nml of hydrogen and then was introduced the above-mentioned mixed gas to begin polymerization at a total pressure of 8 kg/cm$^2$-G. The temperature in the polymerization system was immediately elevated to 85° C.

Thereafter, the polymerization was carried out for 1.5 hour by charging only the mixed gas and maintaining the total pressure of 8 kg/cm$^2$-G and the temperature of the system at 85° C.

After the completion of the polymerization, unaltered sodium chloride was removed by water-washing, and the remaining polymer was washed with methanol, followed by vacuum drying at 80° C. overnight. There was obtained 415 g of ethylene/1-butene copolymer having 0.01 g/10 min. of MFR measured at the temperature of 190° C. under the load of 2.16 kg, 0.42 g/cm$^3$ of the bulk density, 870 μm of the average diameter of the polymer particle and 0.3% by weight of the fine powder of less than 100 μm.

EXAMPLE 13

[Preparation of solid catalyst (zirconium catalyst)]

There are mixed the solid catalyst prepared in Example 12 with 130 ml of hexane to form a suspension.

To the suspension was added 13.0 mmols of triisobutyl aluminum followed continuously introducing ethylene gas to carry out the prepolymerization at 35° C. for 130 minutes. In result, the solid catalyst containing, based on 1 g of silica, 4 g of polyethylene was obtained. In the prepolymerization, the prepolymerized catalyst adhered to the wall of the prepolymerization reactor was not observed.

[Ethylene/1-butene copolymerization]

The same procedure of ethylene/1-butene copolymerization as in Example 12 was repeated except that there was used the prepolymerized solid catalyst as prepared above to obtain 465 g of ethylene/1-butene copolymer having 0.01 g/10 min. of MFR, 0.46 g/cm$^3$ of the bulk density, 900 μm of the average diameter of the polymer particle and 0% by weight of the fine powder of less than 100 μm.

EXAMPLE 14

[Preparation of solid catalyst (zirconium catalyst)]

A nitrogen purged 400 ml glass flask was charged with 15.3 g of silica (adsorbed water; not more than 0.1% by weight, hydroxyl group; 2.7% by weight), which was obtained by drying silica (TG-20643, a product of Fuji Devison Co) under a nitrogen stream at 200° C. for 6 hours, and 153 ml of toluene to obtain a suspension, followed by cooling to 0° C.

To the suspension was added dropwize over a period of 1 hour 65.2 ml of a toluene solution of an organoaluminum oxy compound (a product of Schelling Co., Al; 1.344 mol/l), while the temperature of the reaction system was maintained at 0° C. Subsequently, reaction was carried out at 0° C. for 1 hours, at room temperature for 1 hour and at 80° C. for 4 hours. In the supernatant of the slurry thus obtained, Al was not detected.

Thereafter, the slurry was made up to 300 ml with toluene and 100 ml thereof was separated and introduced into the other 200 ml grass flask of. Into the flask, was added dropwise 10 ml of a toluene solution containing 0.10 mmol of bis(n-butylcyctopentadienyl) zirconium dichloride and 0.20 mmol of bis (1,3-dimethylcyclopentadienyl) zircon lure dichloride over a period of 10 minutes. After the completion of dropping, the reaction was carried out at 30° C. for 1.5 hours. Subsequently, the solvent of the reaction mixture was removed by decantation and the residue was washed with hexane three times to obtain the solid catalyst containing, based on 1 g of silica, 5.3 mg of Zr and 155 mg of Al.

[Ethylene/1-butene copolymerization]

In a thoroughly nitrogen-purged 2-liter stainless steel autoclave was placed 150 g of sodium chloride (a special grade of Wako Junyaku K.K.) followed by vacuum drying at 90° C. for 1 hour. Thereafter, a mixed gas comprising ethylene and 1-butene (1-butene content was 4.5 mol %) was introduced into the autoclave to reduce the pressure inside the system to ordinary pressure and the temperature inside the system was decreased to 70° C. Subsequently, the autoclave was charged with 0.003 mmols in terms of Zr atom of the solid catalyst obtained above and 0.5 mmols of triisobutylaluminum. into the autoclave, was introduced 50 Nml of hydrogen and then was introduced the above-mentioned mixed gas to begin polymerization at a total pressure of 8 kg/cm$^2$-G. The temperature in the polymerization system was immediately elevated to 80° C. Thereafter, the polymerization was carried out for 1 hour by charging only the mixed gas and maintaining the total pressure of 8 kg/cm$^2$-G and the temperature in the system at 80° C.

After the completion of the polymerization, unaltered sodium chloride was removed by water-washing, and the remaining polymer was washed with methanol, followed by vacuum drying at 80° C. overnight.

In result, there was obtained 105.1g of ethylene/1-butene copolymer having 0.17 g/10 min. of MFR measured at the temperature of 190° C. under the load of 2.16 kg, 0.925 g/cm$^3$ of density, 0.2% by weight of the n-decane soluble portion at 23° C., 0.38 g/cm$^3$ of the bulk density, 600 μm of the average diameter of the polymer particle, 0.3% by weight of the fine powder of less than 100 μm, 14 g of melt tension and 4.0 of Mw/Mn.

EXAMPLE 15

[Preparation of solid catalyst (zirconium catalyst)]

The same procedure as in Example 14 was repeated except that there were used 0.15 mmol of bis (n-butylcyclopentadienyl) zirconium chloride and 0.15 mmol of bis (1,3-dimethylcyclopentadienyl) zirconium chloride to obtain the solid catalyst containing, based on 1 g of silica, 5.3 mg of zirconium and 153 mg of aluminum.

[Ethylene/1-butene copolymerization]

The same procedure of ethylene/1-butene copolymerization as in Example 14 was repeated except that there was used the solid catalyst as prepared above to obtain 98.5 g of ethylene/1-butene copolymer having 0.56 g/10 min. of MFR measured at 190° C. under the load of 2.13 kg, 0.919 of density, 0.3 % by weight of a n-decane soluble portion at 23° C., 0.38 g/cm$^3$ of the bulk density, 530 μm of the average diameter of the polymer particle, 0.5% by weight of the fine powder of less than 100 μm, 7.2 g of melt tension and 3.4 of Mw/Mn.

EXAMPLE 16

[Preparation of solid catalyst (zirconium catalyst)]

In a thoroughly nitrogen-purged 400 ml glass flask was introduced 120 ml of hexane, 1.5 mmol of triisobutyl aluminum and 0.07 mg atom in terms of Zr atom of the solid catalyst as prepared in Example 14.

Subsequently, there was continuously introduced ethylene gas to cary out the prepolymerization under ordinary pressure at 35° C. for 6 hours. In the prepolymerization, the prepolymerized catalyst adhered to the wall of the prepolymerization reactor was not observed.

In result, the solid catalyst containing, based on 1 g of silica, 5.1 mg of Zr, 137 mg of Al and 39 g of polyethylene was obtained.

[Ethylene/1-butene copolymerization]

The same procedure of ethylene/1-butene copolymerization as in Example 14 was repeated except that there was used the solid catalyst as prepared above to obtain 100.1 g of ethylene/1-butene copolymer having 0.15 g/10 min. of MFR measured at 190° C. under the load of 2.13 kg, 0.926 g/cm$^3$ of density, 0.2% by weight of a n-decane soluble portion at 23° C., 0.40 g/cm$^3$ of the bulk density, 640 μm of the average diameter of the polymer particle, 0.1% by weight of the fine powder of less than 100 μm, 15 g of melt tension and 4.2 of Mw/Mn.

EXAMPLE 17

[Preparation of solid catalyst (zirconium catalyst)]

The same procedure as in Example 16 was repeated except that, in place of the solid catalyst as prepared in Example 14, there was used the solid catalyst as prepared in Example 15.

In result, the solid catalyst containing, based on 1 g of silica, 5.1 mg of Zr, 142 mg of Al and 13 g of polyethylene was obtained. In the prepolymerization, the prepolymerized catalyst adhered to the wall of the prepolymerization reactor was not observed.

[Ethylene/1-butene copolymerization]

The same procedure of ethylene/1-butene copolymerization as in Example 14 was repeated. In result, was obtained 95 g of ethylene/1-butene copolymer having 0.54 g/10 min. of MFR measured at 190° C. under the load of 2.13 kg, 0.4% by weight of a n-decane soluble portion at 23° C., 0.40 g/cm$^3$ of the bulk density, 580 μm of the average diameter of the polymer particle, 0.1% by weight of the fine powder of less than 100 μm, 7.5 g of melt tension and 3.5 of Mw/Mn.

Comparative Example 4

[Preparation of solid catalyst (zirconium catalyst)]

The same procedure as in Example 14 was repeated except that there was only used 0.3 mmol of bis(n-butylcyclopentadienyl) zirconium chloride to obtain the solid catalyst containing, based on 1 g of silica, 5.2 mg of Zr and 150 mg of Al.

[Ethylene/1-butene copolymerization]

The same procedure of ethylene/1-butene copolymerization as in Example 14 was repeated except that the amount of hydrogen introduced was 10 Nml.

In result, was obtained 192.4 g of ethylene/1-butene copolymer having 3.02 g/10 min. of MFR measured at 190° C. under the load of 2.13 kg, 0.921 g/cm$^3$ of density, 0.5% by weight of a n-decane soluble portion at 23° C., 0.37 g/cm$^3$ of the bulk density, 750 μm of the average diameter of the polymer particle, 0.5% by weight of the fine powder of less than 100 μm, 0.5 of melt tension and 2.4 of Mw/Mn.

[Preparation of solid catalyst (zirconium catalyst)]

A nitrogen purged 400 ml glass flask was introduced with 18.0 g of silica (adsorbed water; not more than 0.1% by weight, hydroxyl group; 2.7% by weight), which was obtained by drying silica (TG-20643, a product of Fuji Devison Co) under a nitrogen stream at 200° C. for 6 hours, and 200 ml of toluene to obtain a suspension, followed by cooling to 0° C.

To the suspension was added dropwise over a period of 45 minutes 70.3 ml of a toluene solution of an organoaluminum oxy compound, which was prepared by drying an aluminoxane of Schelling Co and resolving it in toluene (Al; 1.465 mol/l), while the temperature of the reaction system was maintained at 0° C. Subsequently, reaction was carried out at 0° C. for 1.5 hours, at room temperature for 2 hours and at 80° C. for 4 hours.

Thereafter, in the other 400 ml glass flask, was introduced 30 ml of the slurry thus obtained, 100 ml of decane and 3.0 ml of a decane solution of triisobutyl aluminum (Al; 1 mol/l), followed by stirring for 10 minutes.

Into the flask, was added 2.2 ml of the toluene solution of bis (n-butylcyclopentadienyl) zirconium dichloride (Zr; 0.0451 mol/l), followed by stirring for 15 minutes. Subsequently, there was added 100 ml of decane and then continuously introduced ethylene gas to carry out the prepolymerization under ordinary pressure at 30° C. for 9 hours. In the prepolymerization, the prepolymerized catalyst adhered to the wall of the prepolymerization reactor was not observed.

After the prepolymerization was finished, the solvent of the reaction mixture was removed by decantation and the residue was washed with 150 ml of hexane. The washing treatment was carried out six times to obtain the solid catalyst containing, based on 1 g of silica, 4.4 mg of Zr, 164 mg of Al and 40 g of polyethylene. The solid catalyst was used for the polymerization after resuspending in hexane.

[Ethylene/1-butene copolymerization]

In a thoroughly nitrogen-purged 2-liter stainless steel autoclave was placed 150 g of sodium chloride (a special grade of Wako Junyaku K.K.) followed by vacuum drying at 90° C. for 1 hour. Thereafter, a mixed gas comprising ethylene and 1-butene (1-butene content was 7.2 mol %) was introduced into the autoclave to reduce the pressure inside the system to ordinary pressure and the temperature inside the system was decreased to 70° C.

Subsequently, the autoclave was introduced with 0.003 mmols in terms of Zr atom of the solid catalyst obtained above and 0.5 mmols of triisobutyl aluminum.

Into the autoclave was introduced 30 Nml of hydrogen and then was introduced the above-mentioned mixed gas to begin polymerization at a total pressure of 8 kg/cm$^2$-G. The temperature in the polymerization system was immediately elevated to 75° C.

Thereafter, the polymerization was carried out for 1 hour by charging only the mixed gas and maintaining the total pressure of 8 kg/cm$^2$-G and the temperature in the system at 75° C.

After the completion of the polymerization, unaltered sodium chloride was removed by water-washing, and the remaining polymer was washed with methanol, followed by vacuum drying at 80° C. overnight. In result, there was obtained 192 g of ethylene/1-butene copolymer having 1.79 g/10 min. of MFR measured at the temperature of 190° C. under the load of 2.16 kg, 0.903 g/cm$^3$ of density, 3.4% by weight of a n-decane soluble portion at 23° C., 0.40 g/cm$^3$ of the bulk density, 700 μm of the average diameter of the polymer particle, 0% by weight of the fine powder of less than 100 μm.

EXAMPLE 19

[Preparation of solid catalyst (zirconium catalyst)]

There was mixed 17.8 g of the same silica as prepared in Example 18 with 225 ml of toluene to obtain a suspension, followed by cooling to 0° C. To the suspension was added dropwize over a period of 75 minutes 88.3 ml of a toluene solution of an organoaluminum oxy compound, which was prepared by drying a metylaluminoxane of Schelling Co and resolving it in toluene (Al; 1.157 mol/l), while the temperature of the reaction system was maintained at 0° C. Subsequently, reaction was carried out at 0° C. for 1 hour, at room temperature for 1.5 hour and at 80° C. for 4 hours.

Thereafter, in the other 400 ml glass flask, was introduced 30 ml of the slurry thus obtained, 100 ml of decane and 2.77 ml of a decane solution of triisobutyl aluminum (Al; 1 mol/l), followed by stirring for 15 minutes.

Into the flask, was added 3.54 ml of the toluene solution of bis(n-bytylcyclopentadienyl) zirconium dichloride (Zr; 0.0348 mol/l), followed by stirring for 10 minutes.

Subsequently, there was added 50 ml of decane and then continuously introduced ethylene gas (ordinary pressure) to carry out the prepolymerization at 30° C. for 9 hours. In the prepofymerization, the prepolymerized catalyst adhered to the wall of the prepolymerization reactor was not observed.

After the prepolymerization was finished, the solvent of the reaction mixture was removed by decantation and the residue was washed with 150 ml of hexane. The washing treatment was carried out six times to obtain the solid catalyst containing, based on 1 g of silica, 6.9 mg of Zr, 200 mg of Al and 33 g of polyethylene. The solid catalyst was used for the polymerization after resuspending in hexane.

[Ethylene/1-butene copolymerization]

The same procedure as in Example 18 was repeated except that there was used the solid catalyst as obtained above, the 1-butene content in the mixed gas was 9.0 mol % the amount of hydrogen introduced was 20 Nml and the polymerization temperature was 65° C. In result, there was obtained 236 g of ethylene/1-butene copolymer having 1.46 g/10 min. of MFR measured at the temperature of 190° C. under the load of 2.16 kg, 0.890 g/cm$^3$ of density, 0.42 g/cm$^3$ of the bulk density, 870 μm of the average diameter of the polymer particle and 0% by weight of the fine powder of less than 100 μm.

EXAMPLE 20

[Ethylene/1-butene copolymerization]

The same procedure of ethylene/1-butene copolymerization as in Example 19 was repeated except that the 1-butene content in the mixed gas was 5.5 mol %, the amount of hydrogen introduced was 30 Nml and the polymerization temperature was 80° C. In result, there was obtained 201 g of ethylene/1-butene copolymer having 2.68 g/10 min. of MFR measured at the temperature of 190° C. under the load of 2.16 kg, 0.906 g/cm$^3$ of density, 1.4% by weight of a n-decane soluble portion at 23° C., 0.42 g/cm$^3$ of the bulk density, 800 μm of the average diameter of the polymer particle, 0% by weight of the fine powder of less than 100 μm.

EXAMPLE 21

[Ethylene/1-butene copolymerization]

The same procedure of ethylene/1-butene copolymerization as in Example 19 was repeated except that the polymerization temperature was 85° C. In result, there was obtained 158 g of ethylene/1-butene copolymer having 3.95 g/10 min. of MFR measured at the temperature of 190° C. under the load of 2.16 kg, 0.906 g/cm$^3$ of density, 3.2% by weight of a n-decane soluble portion at 23° C., 0.42 g/cm$^3$ of the bulk density, 800 μm of the average diameter of the polymer particle, 0% by weight of the fine powder of less than 100 μm.

EXAMPLE 22

[Ethylene/1-pentene copolymerization]

Into the autoclave dried as in Example 18, ethylene was introduced to reduce the pressure inside the system to ordinary pressure and the temperature inside the system was decreased to 70° C. Subsequently, the autoclave was charged with 0.005 mmols in terms of Zr atom of the solid catalyst obtained in Example 19 and 0.5 mmols of triisobutylaluminum. Into the autoclave were introduced 3 ml of 1-pentene and 30 Nml of hydrogen, and then was introduced ethylene to begin polymerization at a total pressure of 8 kg/cm$^2$-G. And then, there were continuously introduced ethylene and 1-pentene to carried out the polymerization under a total pressure of 8 kg/cm$^2$-G at 80° C. for 1 hour. The total amount of 1-pentene introduced was 29 ml.

Subsequently, the same procedure as in Example 18 was repeated to obtain 182 g of ethylene/1-pentene copolymer having 2.38 g/10 min. of MFR measured at the temperature of 190° C. under the load of 2.16 kg, 0.922 g/cm$^3$ of density, 0.1% by weight of a n-decane soluble portion at 23° C., 0.39 g/cm$^3$ of the bulk density, 650 μm of the average diameter of the polymer particle, 0.1% by weight of the fine powder of less than 100 μm.

EXAMPLE 23

[Ethylene/1-hexene copolymerization]

The same procedure as in Example 22 was repeated except that 1-hexene was used in a total amount of 30 ml (3 ml+27 ml) to obtain 111 g of ethylene/1-hexene copolymer having 2.60 g/10 min. of MFR measured at the temperature of 190° C. under the load of 2.16 kg, 0.919 g/cm$^3$ of density, 0.42 g/cm$^3$ of the bulk density, 580 μm of the average diameter of the polymer particle, 0.1% by weight of the fine powder of less than 100 μm.

EXAMPLE 24

[Preparation of solid catalyst (zirconium catalyst)]

There are mixed 6.8 g of silica (adsorbed water; not more than 0.1% by weight, hydroxyl group; 2.1% by weight), which was obtained by drying under a nitrogen stream at 300° C. for 6 hours, and 150 ml of toluene to obtain a suspension, followed by cooling to 0° C. To the suspension was added dropwize over a period of 20 minutes 21.8 ml of a toluene solution of an organoaluminum oxy compound as prepared in Example 18 (Al; 1.465 mol/l), while the temperature of the reaction system was maintained at 0° C. Subsequently, reaction was carried out at 0° C. for 1 hour, at room temperature for 1 hour and at 80° C. for 4 hours.

Thereafter, in the other 400 ml glass flask, was introduced 40 ml of the suspension thus obtained, 100 ml of decane and 2.23 ml of a decane solution of triisobutyl aluminum (Al; 1 mol/l), followed by stirring for 10 minutes. into the suspension, was added 1.65 ml of the toluene solution of bis(n-butylcyclopentadienyl) zirconium dichloride (Zr; 0.0451 mol/l), followed by stirring for 10 minutes.

Subsequently, there was added 100 ml of decane and then continuously introduced ethylene gas to carry out the prepolymerization under ordinary pressure at 30° C. for 6 hours. In the prepolymerization, the prepolymerized catalyst adhered to the wall of the prepolymerization reactor was not observed.

After the prepolymeration was finished, the same procedure as in Example 18 was carried out to obtain the solid catalyst containing, based on 1 g of silica, 3.9 mg of Zr, 137 mg of Al and 29 g of polyethylene. The solid catalyst was used for the polymerization after resuspending in hexane.

[Ethylene/1-butene copolymerization]

The same procedure as in Example 18 was repeated except that there was used the solid catalyst as prepared above to obtain 203 g of ethylene/1-butene copolymer having 1.60 g/10 min. of MFR measured at the temperature of 190° C. under the load of 2.16 kg, 0.904 g/cm$^3$ of density, 3.1% by weight of a n-decane soluble portion at 23° C., 0.41 g/cm$^3$ of the bulk density, 660 μm of the average diameter of the polymer particle and 0.1% by weight of the fine powder of less than 100 μm.

Comparative Example 5

[Preparation of solid catalyst (zirconium catalyst)]

There are mixed 3.9 g of silica (adsorbed water; not more than 0.1% by weight, hydroxyl group; 0.5% by weight), which was obtained by sintering under a nitrogen stream at 700° C. for 6 hours, and 100 ml of toluene to obtain a suspension, followed by cooling to 0° C. To the suspension was added dropwise over a period of 30 minutes 16.4 ml of a toluene solution of an organoaluminum oxy compound as prepared in Example 18 (Al; 1.365 mol/l), while the temperature of the reaction system was maintained at 0° C. Subsequently, reaction was carried out at 0° C. for 1 hour, at room temperature for 1 hour and at 80° C. for 4 hours.

Thereafter, in the other 400 ml glass flask, was introduced 50 ml of the suspension thus obtained, 100 ml of decane and 2.88 ml of a decane solution of triisobutyl aluminum (Al; 1 mol/l), followed by stirring for 10 minutes. Into the suspension, was added 4.00 ml of the toluene solution of bis (n-butylcyclopentadienyl) zircon lure dichloride (Zr; 0.0320 mol/l), followed by stirring for 10 minutes.

Subsequently, there was continuously introduced ethylene gas to carry out the prepolymerization under ordinary pressure at 30° C. for 2 hours. In the prepolymerization, the white product adhered to the wall of the prepolymerization reactor was observed.

After the prepolymerization was finished, the solvent was removed by decantation and the residue was washed with 150 ml of hexane. The washing treatment was carried out 4 times to obtain the solid catalyst containing, based on 1 g of silica, 6.2 mg of Zr, 147 mg of Al and 4 g of polyethylene. The solid catalyst was used for the polymerization after resuspending in hexane.

[Ethylene/1-butene copolymerization]

The same procedure as in Example 20 was repeated except that 1-butene content of the mixed gas was 4.6 mol % and the amount of hydrogen introduced was 10 Nml, to obtain 150 g of ethylene/1-butene copolymer having 2.60 g/10 min. of MFR measured at the temperature of 190° C. under the load of 2.16 kg, 0.912 g/cm$^3$ of density, 0.40 g/cm$^3$ of the bulk density, 650 μm of the average diameter of the polymer particle and 0.4% by weight of the fine powder of less than 100 μm.

Comparative Example 6

[Ethylene/1-butene copolymerization]

The same procedure as in Example 20 was repeated except that, in place of the solid catalyst, there were introduced in the autoclave 0.30 mg atom in terms of Al atom of the organoaluminum compound supported on silica as prepared in Example 19 and 1 ml of the toluene solution of bis(n-butylcyclopentadienyl) zirconium dichloride (Zr; 0.003 mol/l), respectively, the 1-butene content in the mixed gas was 4.6 mol % and the amount of hydrogen introduced was 10 Nml. In result, there was obtained 47 g of ethylene/ 1-butene copolymer having 5.10 g/10 min. of MFR measured at the temperature of 190° C. under the load of 2.16 kg, 0.916g/cm$^3$ of density and 0.21 g/cm$^3$ of the bulk density.

In the polymerization, there was observed polymer adhered to the wall of the autoclave was observed and many polymer particle having a rough form.

Comparative Example 7

[Preparation of solid catalyst (zirconium catalyst)]

There are mixed silica as dried in Example 18 with 3.6% by weight of water to dispersed thoroughly. To the silica weighted 9.6 g, 150 ml of toluene was added to obtain a suspension, followed by cooling to 0° C. To the suspension was added dropwise over a period of 45 minutes 65.4 ml of a toluene solution of an organoaluminum oxy compound as prepared in Example 18 (Al; 1.465 mol/l), while the temperature of the reaction system was maintained in the range of at 0° to 1° C. Subsequently, reaction was carried out at 0° C. for 1 hour, at room temperature for 1 hour and at 80° C. for 4.5 hours.

Thereafter, in the other glass flask, was introduced 30 ml of the suspension thus obtained, 100 ml of decane and 4.03 ml of a decane solution of triisobutyl aluminum (Al; 1 mol/l), followed by stirring for 10 minutes.

Into the suspension, was added 4.29 ml of the toluene solution of bis(n-butylcyclopentadienyl) zirconium dichloride (Zr; 0.0313 mol/l), followed by stirring for 5 minutes.

Subsequently, there was continuously introduced ethylene gas to carry out the prepolymerization under ordinary pressure at 30° C. for 2 hours. In the prepolymerization, some of white products adhered to the wall of the prepolymerization reactor was observed.

After the prepolymeration was finished, the solvent was removed by decantation and the residue was washed with 150 ml of hexane. The washing treatment was carried out 6 times to obtain the solid catalyst containing, based on 1 g of silica, 9.0 mg of Zr, 281 mg of Al and 5 g of polyethylene. The solid catalyst was used for the polymerization after resuspending in hexane.

[Ethylene/1-butene copolymerization]

The same procedure as in Example 20 was repeated except that 1-butene content of the mixed gas was 6.0 mol % and the polymerization temperature was 85° C., to obtain 82 g of ethylene/1-butene copolymer having 3.07 g/10 min. of MFR measured at the temperature of 190° C. under the load of 2.16 kg, 0.909 g/cm³ of density, 2.9% by weight of a n-decane soluble portion at 23° C., 0.41 g/cm³ of the bulk density, 400 μm of the average diameter of the polymer particle and 1.1% by weight of the fine powder of less than 100 μm.

EXAMPLE 25

[Preparation of solid catalyst (zirconium catalyst)]

There are mixed 1.4 g of the same silica as in Example 18 with 20 ml of toluene to obtain a suspension, followed by cooling to 0° C. To the suspension was added dropwise over a period of 10 minutes 7.3 ml of a toluene solution of an organoaluminum oxy compound as prepared in Example 18 (Al; 1.465 mol/l). Subsequently, the reaction was carried out in the same manner as in Example 18.

Into the suspension, were added 100 ml of hexane and 4.56 ml of the toluene solution of bis(n-butylcyclopentadienyl) zirconium dichloride (Zr; 0.0313 mol/l), followed by stirring for 10 minutes. Thereafter, there was introduced 3.13 ml of a decane solution of triisobutyl aluminum (Al; 1 mol/l) and then introduced ethylene gas (ordinary pressure) to begin prepolymerization. The prepolymerization was carried out at 35° C. for 9 hours by charging the ethylene gas continuously. In the prepolymerization, polymer ahered to the wall of the reactor was not observed.

After the prepolymeration was finished, the same procedure as in Example 18 was repeated to obtain the solid catalyst containing, based on 1 g of silica, 9.0 mg of Zr, 206 mg of Al and 43 g of polyethylene. The solid catalyst was used for the polymerization after resuspending in hexane.

[Ethylene/1-butene copolymerization]

The same procedure as in Example 18 was repeated except that 1-butene content of the mixed gas was 5.8 mol %, the amount of hydrogen introduced was 20 Nml and the polymerization temperature was 80° C., to obtain 247 g of ethylene/1-butene copolymer having 3.34 g/10 min. of MFR measured at the temperature of 190° C. under the load of 2.16 kg, 0.903 g/cm³ of density, 4.3% by weight of a n-decane soluble portion at 23° C., 0.44 g/cm³ of the bulk density, 900 μm of the average diameter of the polymer particle and 0% by weight of the fine powder of less than 100 μm.

EXAMPLE 26

[Preparation of solid catalyst (zircon lure catalyst)]

The same procedure as in Example 18 was repeated except that, as the Zr compound, there was used bisindenyl zirconium chloride to obtain the solid catalyst containing, based on 1 g of silica, 4.2 mg of Zr, 160 mg of Al and 36 g of polyethylene. In the prepolymerization, polymer ahered to the wall of the reactor was not observed.

[Ethylene/1-butene copolymerization]

The same procedure as in Example 18 was repeated to obtain 178 g of ethylene/1-butene copolymer having 3.50 g/10 min. of MFR measured at the temperature of 190° C. under the load of 2.16 kg, 0.905 g/cm³ of density, 0.39 g/cm³ of the bulk density, 660 μm of the average diameter of the polymer particle and 0.1% by weight of the fine powder of less than 100 μm.

EXAMPLE 27

[Ethylene/1-butene copolymerization]

The same procedure as in Example 18 was repeated except that there was not used triisobutyl aluminum to obtain 77 g of ethylene/1-butene copolymer having 2.91 g/10 min. of MFR measured at the temperature of 190° C. under the load of 2.16 kg, 0.906 g/cm³ of density, 0.39 g/cm³ of the bulk density, 470 μm of the average diameter of the polymer particle and 0.2% by weight of the fine powder of less than 100 μm.

[Preparation of solid catalyst (zirconium catalyst)]

The same procedure as in Example 18 was repeated except that the pepolymerization was carried out for 2 hours to obtain the solid catalyst containing, based on 1 g of silica, 4.3 mg of Zr, 159 mg of Al and 5 g of polyethylene. In the prepolymerization, polymer adhered to the wall of the reactor was not observed.

[Ethylene/1-butene copolymerization]

The same procedure as in Example 18 was repeated except that there was used the solid catalyst as prepared above to obtain 189 g of ethylene/1-butene copolymer having 2.01 g/10 min. of MFR measured at the temperature of 190° C. under the load of 2.16 kg, 0.902 g/cm³ of density, 0.39 g/cm³ of the bulk density, 680 μm of the average diameter of the polymer particle and 0.1% by weight of the fine powder of less than 100 μm.

EXAMPLE 29

[Preparation of solid catalyst (zirconium catalyst)]

The same procedure as in Example 18 was repeated except that, in place of bis(n-butylcyclopentadienyl) zirconium chloride, there was used 0.102 mmol of bis(1,3-dimethylcyclopentadienyl) zirconium dichloride, the amount of the silica and the organoaluminum compound were respectively 1.4 g and 8.24 mmol, and the prepolymerization time was 1 hour. In result, there was obtained the solid catalyst containing, based on 1 g of silica, 6.1 mg of Zr, 157 mg of Al and 4 g of polyethylene. In the prepolymerization, polymer adhered to the wall of the reactor was not observed.

[Ethylene/1-butene copolymerization]

The same procedure as in Example 18 was repeated except that there were used 0.005 mg in terms of Zr atom of the solid catalyst as prepared above and 0.63 mmol of triisobutyl aluminum, the 1-butene content in mixed gas was 5.9 mol % the amount of hydrogen introduced was 50 Nml and the polymerization temperature was 80° C. to obtain 187 g of ethylene/1-butene copolymer having 0.018 g/10 min. of MFR measured at the temperature of 190° C. under the load of 2.16 kg, 0.44 g/cm$^3$ of the bulk density, 600 μm of the average diameter of the polymer particle and 0.1% by weight of the fine powder of less than 100 μm.

The results of the preparation of the catalysts and the polymerization are shown in Tables 3 and 4.

TABLE 3

| | Component (a-1) | | | Component (a-2) | Component [B] | | Component [C] (i-Bu)$_3$Al | OH | Element and polyolefin supported on carrier* | | |
|---|---|---|---|---|---|---|---|---|---|---|---|
| | (i) (g) | (ii) (% by weight) | (iii) (% by weight) | (mmol in terms of Al atom) | Transition metal compound | (mmol in terms of Zr atom) | (mmol in terms of Al atom) | Al$_{a-2}$ (mol ratio) | Zr (mg) | Al (mg) | PE (g) |
| Ex. 18 | 18.0 | <0.1 | 2.7 | 103 | (n-BuCp)$_2$ZrCl$_2$ | 0.100 | 3.00 | 0.28 | 4.4 | 164 | 40 |
| Ex. 19 | 17.8 | <0.1 | 2.7 | 102 | (n-BuCp)$_2$ZrCl$_2$ | 0.123 | 2.77 | 0.28 | 6.9 | 200 | 33 |
| Ex. 24 | 6.8 | <0.1 | 2.1 | 31.9 | (n-BuCp)$_2$ZrCl$_2$ | 0.074 | 2.23 | 0.26 | 3.9 | 137 | 29 |
| Ex. 25 | 1.4 | <0.1 | 2.7 | 10.7 | (n-BuCp)$_2$ZrCl$_2$ | 0.143 | 3.13 | 0.21 | 9.0 | 206 | 43 |
| Ex. 26 | 18.0 | <0.1 | 2.7 | 103 | Ind$_2$ZrCl$_2$ | 0.100 | 3.00 | 0.28 | 4.2 | 160 | 36 |
| Ex. 28 | 18.0 | <0.1 | 2.7 | 103 | (n-BuCp)$_2$ZrCl$_2$ | 0.100 | 3.00 | 0.28 | 4.3 | 159 | 5 |
| Ex. 29 | 1.4 | <0.1 | 2.7 | 8.24 | (1,3-Me$_2$Cp)$_2$ZrCl$_2$ | 0.102 | 2.47 | 0.27 | 6.1 | 159 | 4 |
| Ex. 30 | 18.2 | 0.3 | 2.7 | 140 | (1,3-Me$_2$Cp)$_2$ZrCl$_2$ | 0.15 | 15 | 0.12 | 4.6 | 195 | 4.2 |
| Comp. Ex. 5 | 3.9 | <0.1 | 0.5 | 22.4 | (n-BuCp)$_2$ZrCl$_2$ | 0.128 | 2.88 | 0.05 | 6.2 | 147 | 4 |
| Comp. Ex. 7 | 9.6 | 3.6 | 2.7 | 95.8 | (n-BuCp)$_2$ZrCl$_2$ | 0.134 | 4.03 | 0.16 | 9.0 | 281 | 5 |

*the amounts of those supported on 1 g of silica

TABLE 4

| | Comonomer | | Polymerization temperature (°C.) | Zr (mg atom) | (i-Bu)$_3$Al (mmol) | Yield (g) | MFR (g/10 min) | Density (g/cm$^3$) | Amount of a n-decane soluble portion (% by weight) | Bulk density (g/cm$^3$) | Average diameter (μm) | Amounts of fine powder (% by weight) |
|---|---|---|---|---|---|---|---|---|---|---|---|---|
| | Kind | (mol %) | | | | | | | | | | |
| Ex. 18 | 1-butene | 7.2 | 75 | 0.003 | 0.5 | 192 | 1.79 | 0.903 | 3.4 | 0.40 | 700 | 0 |
| Ex. 19 | 1-butene | 9.0 | 65 | 0.003 | 0.5 | 236 | 1.46 | 0.890 | — | 0.42 | 870 | 0 |
| Ex. 20 | 1-butene | 5.5 | 80 | 0.003 | 0.5 | 201 | 2.68 | 0.906 | 1.4 | 0.42 | 800 | 0 |
| Ex. 21 | 1-butene | 9.0 | 85 | 0.003 | 0.5 | 158 | 3.95 | 0.906 | 3.2 | 0.42 | 800 | 0 |
| Ex. 22 | 1-pentene | 32 ml | 80 | 0.005 | 0.5 | 182 | 2.38 | 0.922 | 0.1 | 0.39 | 650 | 0.1 |
| Ex. 23 | 1-hexene | 30 ml | 80 | 0.005 | 0.5 | 111 | 2.60 | 0.919 | — | 0.42 | 580 | 0.1 |
| Ex. 24 | 1-butene | 7.2 | 75 | 0.003 | 0.5 | 203 | 1.60 | 0.904 | 3.1 | 0.41 | 660 | 0.1 |
| Ex. 25 | 1-butene | 5.8 | 80 | 0.003 | 0.5 | 247 | 3.34 | 0.903 | 4.3 | 0.44 | 900 | 0 |
| Ex. 26 | 1-butene | 7.2 | 75 | 0.003 | 0.5 | 178 | 3.50 | 0.905 | — | 0.39 | 660 | 0.1 |
| Ex. 27 | 1-butene | 7.2 | 75 | 0.003 | 0 | 77 | 2.91 | 0.906 | — | 0.39 | 470 | 0.2 |
| Ex. 28 | 1-butene | 7.2 | 75 | 0.003 | 0.5 | 189 | 2.01 | 0.902 | — | 0.39 | 680 | 0.1 |
| Ex. 29 | 1-butene | 5.9 | 80 | 0.005 | 0.63 | 187 | 0.018 | — | — | 0.44 | 600 | 0.1 |
| Ex. 30 | 1-butene | 5.1 | 75 | 0.004 | 1.00 | 422 | 0.01> | — | — | 0.45 | 860 | 0 |
| Comp. Ex. 5 | 1-butene | 4.6 | 80 | 0.003 | 0.5 | 150 | 2.60 | 0.912 | — | 0.40 | 650 | 0.4 |
| Comp. Ex. 6 | 1-butene | 5.5 | 80 | * | * | 47 | 5.10 | 0.916 | — | 0.21 | — | — |

TABLE 4-continued

| | Comonomer | | Polyermization tempera- ture (°C.) | Zr (mg atom) | (i-Bu)$_3$Al (mmol) | Yield (g) | MFR (g/10 min) | Density (g/cm$^3$) | Amount of a n-decane soluble portion (% by weight) | Bulk density (g/cm$^3$) | Average diameter (μm) | Amounts of fine powder (% by weight) |
|---|---|---|---|---|---|---|---|---|---|---|---|---|
| | Kind | (mol %) | | | | | | | | | | |
| Comp. Ex. 7 | 1-butene | 6.0 | 85 | 0.003 | 0.5 | 82 | 3.09 | 0.909 | 2.9 | 0.41 | 400 | 1.1 |

*Zr free from silica was used.

EXAMPLE 30

[Preparation of solid catalyst (zirconium catalyst)]

A thoroughly nitrogen purged 400 ml glass flask was charged with 18.2 g of silica (TG-40209, a product of Fuji Devison Co, adsorbed water; 0.3% by weight, hydroxyl group; 2.7% by weight) and 300 ml of toluene to obtain a suspension, followed by cooling to 0° C. To the suspension was added dropwise over a period of 1 hour 33.6 ml of a toluene solution of an organoaluminum oxy compound (a product of Schelling Co, Al; 4.16 mol/l), while the temperature of the reaction system was maintained at 0° C. Subsequently, reaction was carried out at 0° C. for 30 minutes and at 95° C. for 24 hours. After the completion of the reaction, the suspension was cooled to 60° C., and the solvent was removed by decantation. The residue was washed three time with 300 ml of hexane.

Thereafter, there was mixed the solid component thus obtained weighted of 4.05 g with hexane to form a suspension and, to the suspension, was added 5.2 ml of a toluene solution of bis (1,3-dimethylcyclopentadienyl) zirconium dichloride (Zr; 0.0291 mol/l). Subsequently, there was continuously introduced ethylene gas to carry out the prepolymerization under ordinary pressure at 35° C. for 2 hours. In the prepolymerization, the prepolymerized catalyst adhered to the wall of the prepolymerization reactor was not observed.

After the prepolymeration was finished, the solvent of the reaction mixture was removed by decantation and the residue was washed with 150 ml of hexane. The washing treatment was carried out four times to obtain the solid catalyst containing, based on 1 g of silica, 4.6 mg of Zr, 195 mg of Al and 4.2 g of polyethylene.

[Ethylene/1-butene copolymerization]

In a thoroughly nitrogen-purged 2-liter stainless steel autoclave was placed 150 g of sodium chloride (a special grade of Wako Junyaku K.K.) followed by vacuum drying at 90° C. for 1 hour. Thereafter, a mixed gas comprising ethylene and 1-butene (1-butene content was 5.1 mol %) was introduced into the autoclave to reduce the pressure inside the system to ordinary pressure and the temperature inside the system was decreased to 75° C.

Subsequently, the autoclave was charged with 0.004 mmols in terms of Zr atom of the solid catalyst obtained above and 1 mmol of triisobutylaluminum.

Into the autoclave was introduced 50 Nml of hydrogen and then was introduced the above-mentioned mixed gas to begin polymerization at a total pressure of 8 kg/cm$^2$-G. The temperature in the polymerization system was immediately elevated to 85° C. Thereafter, the polymerization was carried out for 1.5 hour by charging only the mixed gas and maintaining the total pressure of 8 kg/cm$^2$-G and the temperature in the system at 85° C.

After the completion of the polymerization, unaltered sodium chloride was removed by water-washing, and the remaining polymer was washed with methanol, followed by vacuum drying at 80° C. overnight. In result, there was obtained 422 g of ethylene/1-butene copolymer having 0.01 g/10 min. of MFR measured at the temperature of 190° C. under the load of 2.16 kg, 0.45 g/cm$^3$ of the bulk density, 860 μm of the average diameter of the polymer particle and 0% by weight of the fine powder of less than 100 μm.

EXAMPLE 31

[Preparation of solid catalyst (zirconium catalyst)]

A nitrogen purged 400 ml glass flask was charged with 15.3 g of silica (adsorbed water; not more than 0.1% by weight, hydroxyl group; 2.7% by weight), which was obtained by drying silica (TG-20643, a product of Fuji Devison Co) under a nitrogen stream at 200° C. for 6 hours, and 153 ml of toluene to obtain a suspension, followed by cooling to 0° C.

To the suspension was added dropwise over a period of 1 hour 65.2 ml of a toluene solution of an organoaluminum oxy compound, which was prepared by drying an aluminoxane of Schelling Co and resolving it in toluene (Al; 1.344 mol/l), while the temperature of the reaction system was maintained at 0° C. Subsequently, reaction was carried out at 0° C. for 1 hour, at room temperature for 1 hour and at 80° C. for 4 hours. In the supernatant of the reaction mixture, Al was not detected.

Thereafter, the slurry was made up to 300 ml with toluene and 40 ml of the diluted slurry was separated in the other 400 ml glass flask. Then, in the flask, was introduced 100 ml of decane and 3.5 ml of a decane solution of triisobutyl aluminum (Al; 1 mol/l), followed by stirring for 10 minutes. Subsequently, in to the suspension thus obtained, was added 6 ml of a toluene solution containing 0.04 mmol of bis(n-butylcyclopentadienyl) zirconium dichloride and 0.08 mmol of bis(1,3-dimethylcyclopentadienyl) zirconium dichloride, followed by stirring for 10 minutes. Then, there was added 100 ml of decane and continuously introduced ethylene gas to carry out the prepolymerization under ordinary pressure at 35° C. for 7 hours. In the prepolymerization, the prepolymerized catalyst adhered to the wall of the prepolymerization reactor was not observed.

After the prepolymeration was finished, the solvent of the reaction mixture was removed by decantation and the residue was washed with 150 ml of hexane. The washing treatment was carried out three times to obtain the solid catalyst containing, based on 1 g of silica, 5.1 mg of Zr, 148 mg of Al and 37 g of polyethylene. The solid catalyst was used for the polymerization after resuspending in hexane.

[Ethylene/1-butene copolymerization]

In a thoroughly nitrogen-purged 2-liter stainless steel autoclave was placed 150 g of sodium chloride (a special grade of Wako Junyaku K.K.) followed by vacuum drying at 90° C. for 1 hour. Thereafter, a mixed gas comprising ethylene and 1-butene (1-butene content was 4.7 mol %) was introduced into the autoclave to reduce the pressure inside the system to ordinary pressure and the temperature inside the system was decreased to 70° C. Subsequently, the autoclave was charged with 0.003 mmols in terms of Zr atom of the solid catalyst obtained above and 0.5 mmols of triisobutylaluminum. Into the autoclave was introduced 50 Nml of hydrogen and then was introduced the above-mentioned mixed gas to begin polymerization at a total pressure of 8 kg/cm$^2$-G. The temperature in the polymerization system was immediately elevated to 80° C. Thereafter, the polymerization was carried out for 1 hour by charging only the mixed gas and maintaining the total pressure of 8 kg/cm$^2$-G and the temperature in the system at 80° C.

After the completion of the polymerization, unaltered sodium chloride was removed by water-washing, and the remaining polymer was washed with methanol, followed by vacuum drying at 80° C. overnight.

In result, there was obtained 110.1 g of ethylene/1-butene copolymer having 0.21 g/10 min. of MFR measured at the temperature of 190° C. under the load of 2.16 kg, 0.924 g/cm$^3$ of density, 0.2% by weight of a n-decane soluble portion at 23° C., 0.41 g/cm$^3$ of the bulk density, 610 μm of the average diameter of the polymer particle, 0.1% by weight of the fine powder of less than 100 μm 13g of melt tension and 3.9 of Mw/Mn.

EXAMPLE 32

[Preparation of solid catalyst (zirconium catalyst)]

The same procedure as in Example 31 was repeated except that there were used 0.06 mmol of bis(n-butylcyclopentadienyl) zirconium dichloride and 0.06 mmol of bis(1, 3-dimethylcyclopentadienyl) zirconium dichloride. In result, there was obtained the solid catalyst containing, based on 1 g of silica, 5.0 mg of Zr, 150 mg of Al and 40 g of polyethylene. In the prepolymerization, polymer adhered to the wall of the reactor was not observed.

[Ethylene/1-butene copolymerization]

The same procedure as in Example 31 was repeated. In result, there was obtained 102.0 g of ethylene/1-butene copolymer having 0.48 g/10 min. of MFR measured at the temperature of 190° C. under the load of 2.16 kg, 0.4% by weight of a n-decane soluble portion, 0.921 g/cm$^3$ of density, 0.40 g/cm$^3$ of the bulk density, 590 μm of the average diameter of the polymer particle and 0.1% by weight of the fine powder of less than 100 μm, 7.8 g of melt tension and 3.5 of Mw/Mn.

EXAMPLE 33

[Preparation of solid catalyst (zirconium catalyst)]

The same procedure as in Example 31 was repeated except that there were used 0.08 mmol of bis (n-butylcyclopentadienyl) zirconium dichloride and 0.04 mmol of bis (1,3-dimethylcyclopentadienyl) zirconium dichloride. In result, there was obtained the solid catalyst containing, based on 1 g of silica, 5.0 mg of Zr, 145 mg of Al and 43 g of polyethylene. In the prepolymerization, polymer adhered to the wall of the reactor was not observed.

[Ethylene/1-butene copolymerization]

The same procedure as in Example 31 was repeated.

In result, there was obtained 91.0 g of ethylene/1-butene copolymer having 0.95 g/10 min. of MFR measured at the temperature of 190° C. under the load of 2.16 kg, 0.918 g/cm$^3$ of density, 0.6% by weight of a n-decane soluble portion at 23° C., 0.40 g/cm$^3$ of the bulk density, 650 μm of the average diameter of the polymer particle and 0.1% by weight of the fine powder of less than 100 μm, 5.2 g of melt tension and 2.9 of Mw/Mn.

Comparative Example 8

[Preparation of solid catalyst (zirconium catalyst)]

The same procedure as in Example 31 was repeated except that there was singly used 0.12 mmol of bis(n-butylcyclopentadienyl) zirconium chloride.

In result, there was obtained the solid catalyst containing, based on 1 g of silica, 5.0 mg of Zr, 146 mg of Al and 41 g of polyethylene. In the prepolymerization, polymer adhered to the wall of the reactor was not observed.

[Ethylene/1-butene copolymerization]

The same procedure as in Example 31 was repeated except that the amount of hydrogen introduced was 10 Nml.

In result, there was obtained 198.1 g of ethylene/1-butene copolymer having 2.88 g/10 min. of MFR measured at the temperature of 190° C. under the load of 2.16 kg, 0.919 g/cm$^3$ of density, 0.6% by weight of a n-decane soluble portion at 23° C., 0.41 g/cm$^3$ of the bulk density, 770 μm of the average diameter of the polymer particle and 0% by weight of the fine powder of less than 100 μm, 0.6 g of melt tension and 2.5 of Mw/Mn.

What is claimed is:

1. An olefin polymerization process which comprises polymerizing or copolymerizing olefin in the presence of a catalyst comprising an olefin polymerization solid catalyst component in which said olefin polymerization solid catalyst component comprises a solid catalyst component (A-1) comprising (a-1) a particulate carrier composed of (i) SiO$_2$, and containing (ii) less than 0.5% by weight of water and (iii) 2.0 to 3.5% by weight of surface hydroxyl groups, (a-2) an aluminoxane compound, and (a-3) a transition metal compound of a metal selected from the group consisting of zirconium, titanium and hafnium, and containing a ligand having a cyclopentadienyl skeleton, wherein the aluminoxane compound (a-2) and the transition metal compound (a-3) are supported on the particulate carrier (a-1).

2. The olefin polymerization process as claimed in claim 1 wherein said transition metal compound (a-3) includes at least two kinds of transition metal compounds.

3. The olefin polymerization process as claimed in claim 1 or 2, wherein said transition metal compound (a-3) contains ligands having a cyclopentadienyl skeleton which is substituted by a hydrocarbon group.

4. The olefin polymerization process as claimed in claim 1, wherein said olefin polymerization solid catalyst component is formed by prepolymerizing olefin in a suspension or a vapor phase in the presence of said solid catalyst component (A-1).

5. An olefin polymerization process which comprises polymerizing or copolymerizing olefin in the presence of a catalyst comprising an olefin polymerization solid catalyst component and (C-2) a catalyst component being an organoaluminum compound, in which said olefin polymerization solid catalyst component comprises a solid catalyst component (A-1) comprising (a-1) a particulate carrier composed of (i) $SiO_2$, and containing (ii) less than 0.5% by weight of water and (iii) 2.0 to 3.5% by weight of surface hydroxyl groups,
(a-2) an aluminoxane compound, and (a-3) a transition metal compound of a metal selected from the group consisting of zirconium, titanium and hafnium, and containing a ligand having a cyclopentadienyl skeleton, wherein the aluminoxane compound (a-2) and the transition metal compound (a-3) are supported on the particulate carrier (a-1).

6. The olefin polymerization process as claimed in claim 5 wherein said transition metal compound (a-3) includes at least two kinds of transition metal compounds.

7. The olefin polymerization process as claimed in claim 5 or 6, wherein said transition metal compound (a-3) contains ligands having a cyclopentadienyl skeleton which is substituted by a hydrocarbon group.

8. The olefin polymerization process as claimed in claim 5 wherein said olefin polymerization solid catalyst component is formed by prepolymerizing olefin in a suspension or a vapor phase in the presence of said solid catalyst component (A-1).

9. An olefin polymerization process which comprises polymerizing or copolymerizing olefin in the presence of a catalyst comprising an olefin polymerization solid catalyst component, in which said olefin polymerization solid catalyst component is formed by prepolymerization of olefin in the presence of a solid catalyst component (A-2) and a catalyst component (B), said solid catalyst component (A-2) comprising (a-1) a particulate carrier composed of (i) $SiO_2$, and containing (ii) less than 0.5% by weight of water and (iii) 2.0% to 3.5% by weight of surface hydroxyl groups, and (a-2) an aluminoxane compound, wherein the aluminoxane compound (a-2) is supported on the particulate carrier (a-1); and said catalyst component (B) being a transition metal compound of a metal selected from the group consisting of zirconium, titanium and hafnium, and containing a ligand having a cyclopentadienyl skeleton.

10. The olefin polymerization process as claimed in claim 9 wherein said transition metal compound (B) includes at least two kinds of transition metal compounds.

11. The olefin polymerization process as claimed in claim 9 or 10, wherein said transition metal compound (B) contains ligands having a cyclopentadienyl skeleton which is substituted by a hydrocarbon group.

12. An olefin polymerization process which comprises polymerizing or copolymerizing olefin in the presence of a catalyst comprising an olefin polymerization solid catalyst component and (C-2) a catalyst component being an organoaluminum compound, wherein said olefin polymerization solid catalyst component is formed by prepolymerization of olefin in the presence of a solid catalyst component (A-2) and a catalyst component (B), said catalyst component (A-2) comprising (a-1) a particulate carrier composed of (i) $SiO_2$, and containing (ii) less than 0.5% by weight of water and (iii) 2.0 to 3.5% by weight of surface hydroxyl groups, and (a-2) an aluminoxane compound, wherein the aluminoxane compound (a-2) is supported on the particulate carrier (a-1); and said catalyst component (B) being a transition metal compound of a metal selected from the group consisting of zirconium, titanium and hafnium, and containing a ligand having a cyclopentadienyl skeleton.

13. The olefin polymerization process as claimed in claim 12 wherein said transition metal compound (B) includes at least two kinds of transition metal compounds.

14. The olefin polymerization process as claimed in claim 12 or 13, wherein said transition metal compound (B) contains ligands having a cyclopentadienyl skeleton which is substituted by a hydrocarbon group.

15. The olefin polymerization process as claimed in claim 1, 4 or 9, wherein said transition metal is zirconium.

16. The olefin polymerization process as claimed in claim 5, 8 or 12, wherein said transition metal is zirconium.

17. The olefin polymerization process as claimed in claim 9 wherein the olefin polymerization solid catalyst is formed by prepolymerization of olefin in the presence of the (A-2) solid catalyst component, the (B) catalyst component and (C-1) a catalyst component which is an organoaluminum compound.

18. The olefin polymerization process as claimed in claim 12 wherein the olefin polymerization solid catalyst is formed by prepolymerization of olefin in the presence of the (A-2) solid catalyst component, the (B) catalyst component and (C-1) a catalyst component which is an organoaluminum compound.

* * * * *